(12) United States Patent
Schindehette

(10) Patent No.: US 10,905,234 B1
(45) Date of Patent: Feb. 2, 2021

(54) OVERHEAD STORAGE SYSTEM AND METHOD

(71) Applicant: Steven Schindehette, Altamonte Springs, FL (US)

(72) Inventor: Steven Schindehette, Altamonte Springs, FL (US)

(*) Notice: Subject to any disclaimer, the term of this patent is extended or adjusted under 35 U.S.C. 154(b) by 0 days.

(21) Appl. No.: 16/851,692

(22) Filed: Apr. 17, 2020

Related U.S. Application Data

(63) Continuation-in-part of application No. 16/138,025, filed on Sep. 21, 2018, now Pat. No. 10,646,035.

(51) Int. Cl.
*A47B 47/00* (2006.01)
*A47B 45/00* (2006.01)
*B62H 3/12* (2006.01)

(52) U.S. Cl.
CPC .......... *A47B 47/0083* (2013.01); *A47B 45/00* (2013.01); *A47B 47/0058* (2013.01); *B62H 3/12* (2013.01); *A47B 2230/0003* (2013.01); *A47B 2230/07* (2013.01)

(58) Field of Classification Search
CPC ..... A47B 57/562; A47B 57/34; A47B 47/021; A47B 47/02; A47B 47/0058; A47B 47/0083; A47B 47/024; A47B 47/027; A47B 47/028; A47B 47/045; A47B 47/05; A47B 57/00; A47B 57/30; A47B 57/06; A47B 45/00; A47B 87/00; A47B 91/02; A47B 91/16; A47B 91/022; A47B 91/024; A47B 91/026; A47B 96/14; A47B 96/1425; A47B 96/1433; A47B 96/145; A47B 96/1458; A47B 96/1475; A47B 96/025; A47B 55/02; A47F 5/10; A47F 5/101; A47F 5/01; B62H 3/12
USPC ...... 211/85.7, 191, 189, 192, 134, 186, 187, 211/175, 204, 206, 90.01–90.04, 117, 119
See application file for complete search history.

(56) References Cited

U.S. PATENT DOCUMENTS

| | | | |
|---|---|---|---|
| 642,561 A * | 1/1900 | Phillips | A47F 5/10 211/175 |
| 865,268 A * | 9/1907 | Powell | A47F 7/30 211/27 |
| 2,045,942 A * | 6/1936 | Brody | A47B 45/00 211/182 |
| 2,805,776 A * | 9/1957 | Levitin | A47F 7/30 211/27 |

(Continued)

*Primary Examiner* — Jennifer E. Novosad
(74) *Attorney, Agent, or Firm* — Brian S. Steinberger; Hilary F. Steinberger; Law Offices of Brian S. Steinberger, P.A.

(57) ABSTRACT

Free standing storage system for garage spaces and the like, without requiring any attachments, and no tools are required. The system includes positioning vertical supports, each having ends with extendable threaded footers that can vertically abut each support against both a floor and ceiling. Posts can have a generally rectangular configuration with two short spaces between two supports on a left side and right side, and two long spaces between the two supports (posts) between the left and right posts. Accessory bar(s) can be positioned between the left and right side pairs of vertical posts. Fasteners, can attach parts together. A pair of telescoping horizontal beams positioned between the left and right side posts. Shelves with wire racks or boars can be used with the horizontal beams.

9 Claims, 20 Drawing Sheets

(56) References Cited

U.S. PATENT DOCUMENTS

| | | | |
|---|---|---|---|
| 2,877,602 A * | 3/1959 | Larsen | A47B 47/027 211/175 |
| 3,190,405 A | 6/1965 | Squire | |
| 3,420,030 A | 1/1969 | Kosmach | |
| 3,533,502 A * | 10/1970 | Hansen | A47B 45/00 206/386 |
| 3,604,175 A | 9/1971 | Gray | |
| 3,650,078 A | 3/1972 | Jennings | |
| 3,742,662 A | 7/1973 | Ballou | |
| 3,771,466 A * | 11/1973 | Ferdinand | A47B 57/42 108/109 |
| 3,963,290 A * | 6/1976 | Rennemann | B65D 88/14 312/321 |
| 4,004,393 A | 1/1977 | Morris | |
| 4,261,470 A * | 4/1981 | Dolan | F16B 12/36 108/55.1 |
| 4,715,502 A * | 12/1987 | Salmon | H04Q 1/09 211/175 |
| 5,273,170 A * | 12/1993 | Azzopardi | B65G 1/02 211/189 |
| 5,556,064 A * | 9/1996 | Cowe | F16M 11/24 248/172 |
| 5,628,540 A * | 5/1997 | James | B60R 9/00 211/189 |
| 5,660,637 A * | 8/1997 | Dodge | B05B 13/0285 118/500 |
| 5,791,502 A | 8/1998 | Bietz et al. | |
| 5,842,586 A * | 12/1998 | Melby | A47B 57/545 211/187 |
| 6,026,932 A | 2/2000 | Comp | |
| 6,223,908 B1 * | 5/2001 | Kurtsman | H04Q 1/08 211/175 |
| 6,422,405 B1 * | 7/2002 | Haenszel | A47B 45/00 108/55.1 |
| 6,655,533 B2 * | 12/2003 | Guebre-Tsadik | H05K 7/186 211/175 |
| 8,167,152 B1 * | 5/2012 | Gatti | E04B 2/821 211/187 |
| 8,336,722 B2 * | 12/2012 | Cardwell | B65G 1/026 211/191 |
| 8,348,071 B1 * | 1/2013 | Janlert | F16M 5/00 211/175 |
| 8,579,126 B1 * | 11/2013 | Cole | D06F 57/08 211/85.24 |
| 8,616,388 B2 * | 12/2013 | Butler | A47B 57/06 211/187 |
| 8,827,232 B2 * | 9/2014 | Crowley | A47B 43/003 248/670 |
| 10,646,035 B1 * | 5/2020 | Schindehette | A47B 47/0083 |
| 2003/0155319 A1 * | 8/2003 | Wishart | A47F 5/13 211/189 |
| 2005/0034922 A1 | 2/2005 | Wyse | |
| 2012/0048818 A1 | 3/2012 | Fiscus et al. | |
| 2012/0097628 A1 * | 4/2012 | Blacknell | A47B 45/00 211/85.3 |
| 2016/0037913 A1 * | 2/2016 | Franck | A47B 57/20 211/208 |
| 2017/0215579 A1 * | 8/2017 | Cooper | A47B 47/0083 |
| 2017/0310090 A1 * | 10/2017 | Woodley | A47B 97/00 |
| 2019/0038022 A1 * | 2/2019 | Baines | A47B 47/028 |

\* cited by examiner

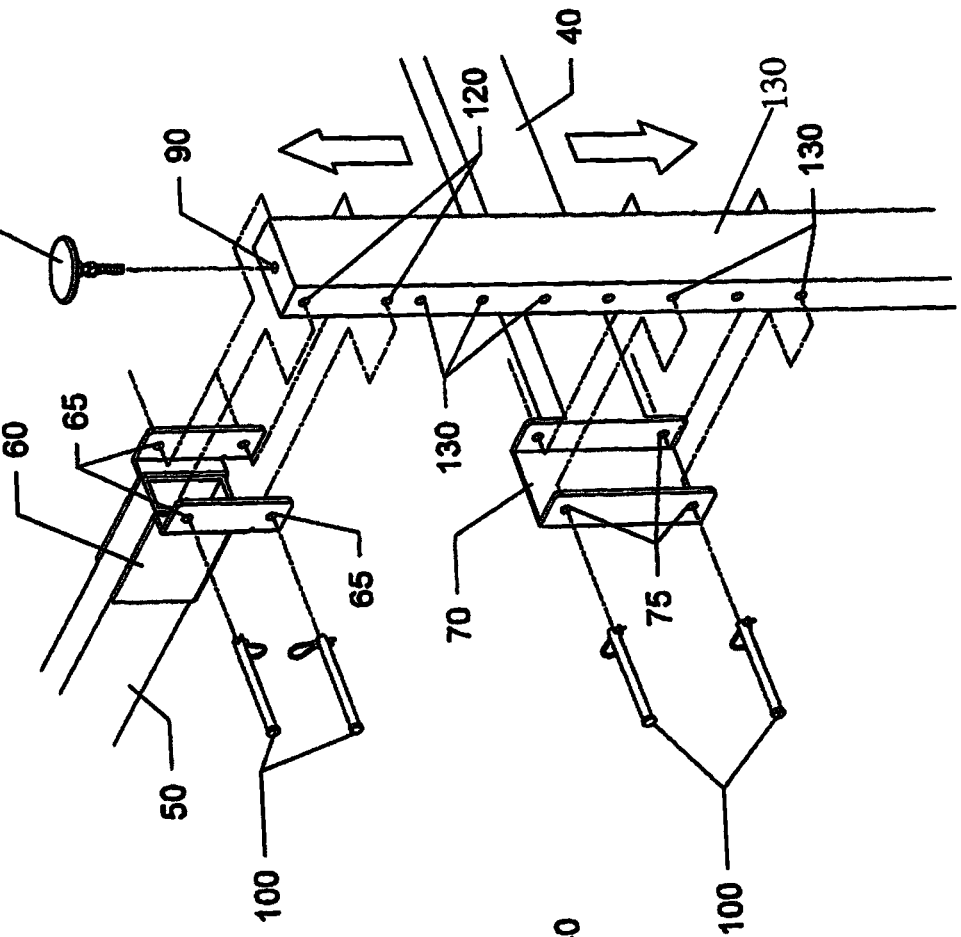
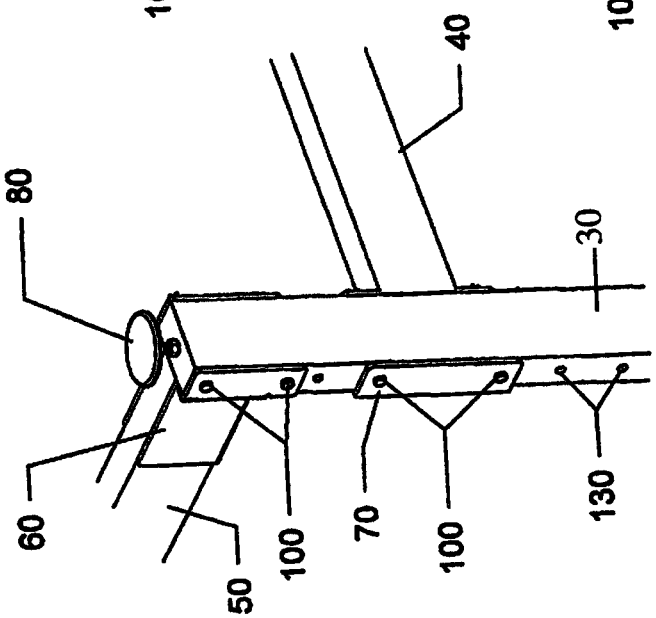

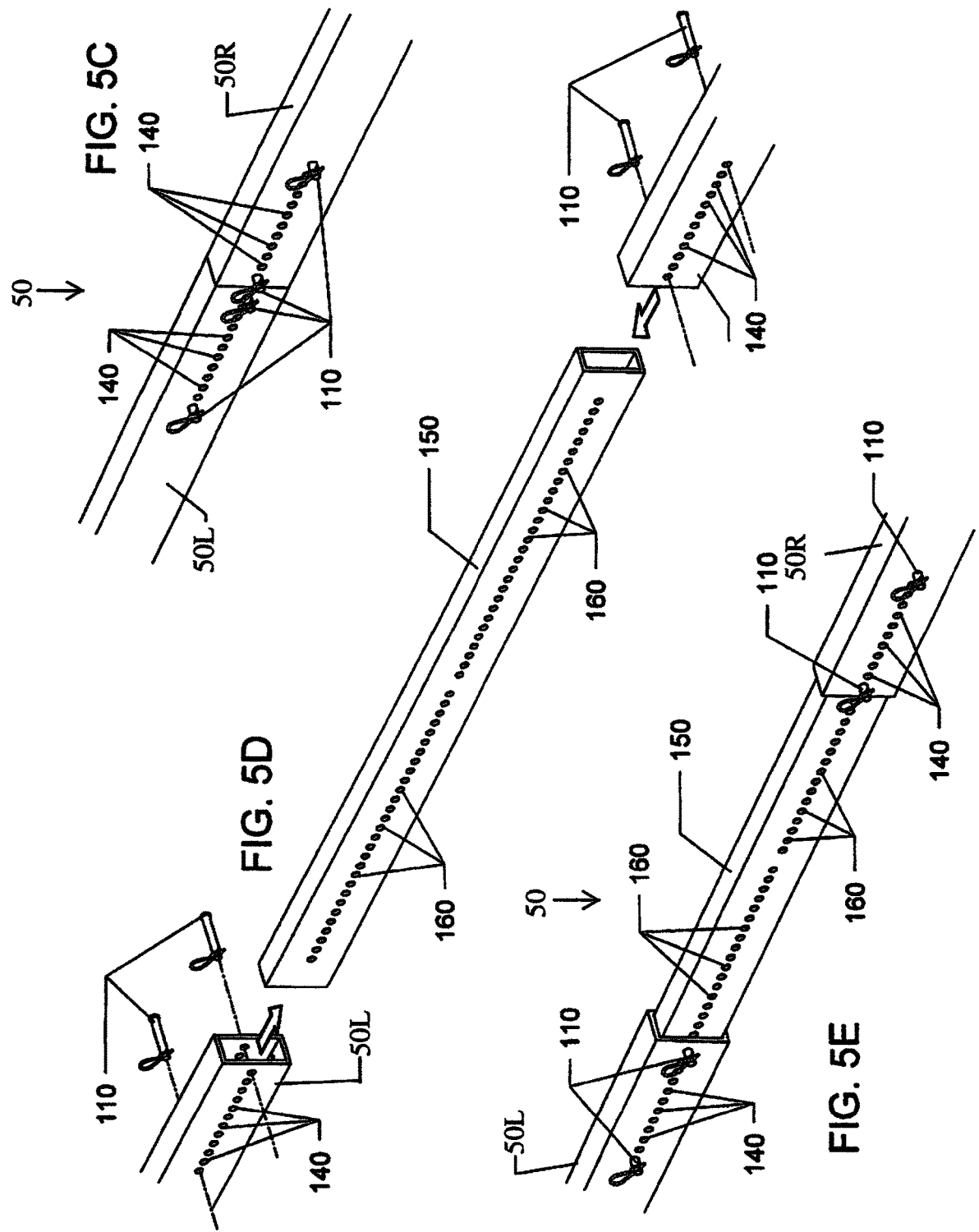

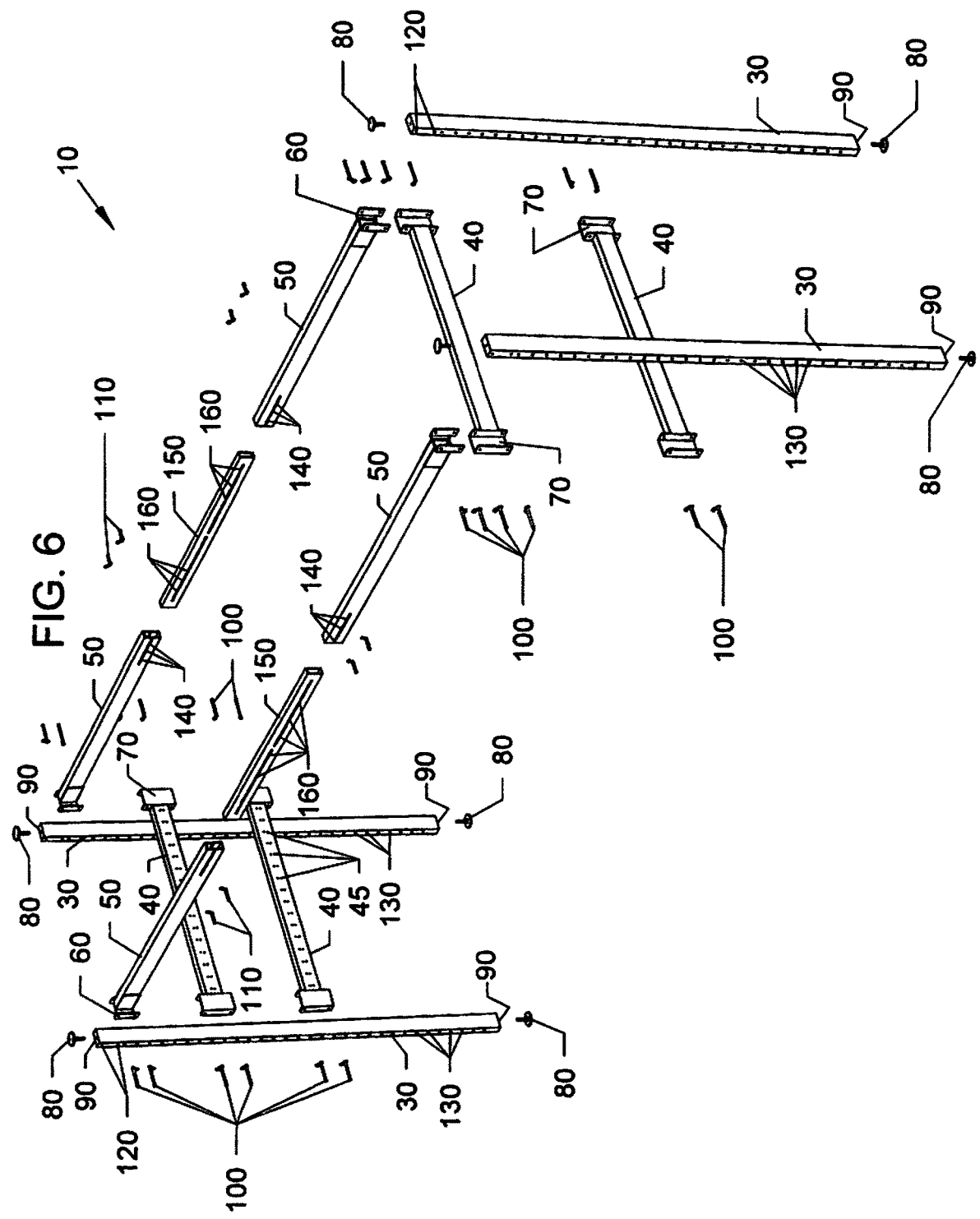

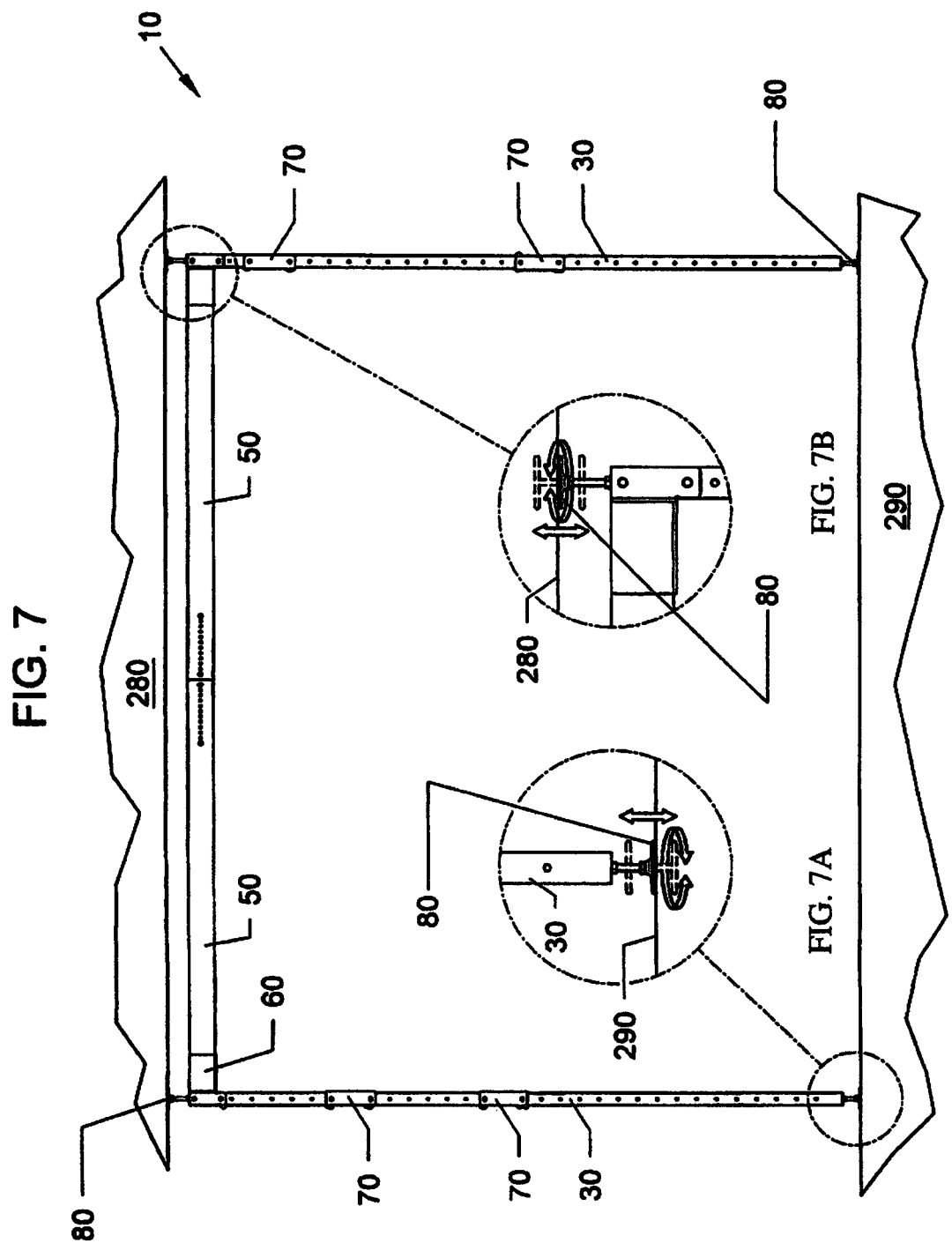

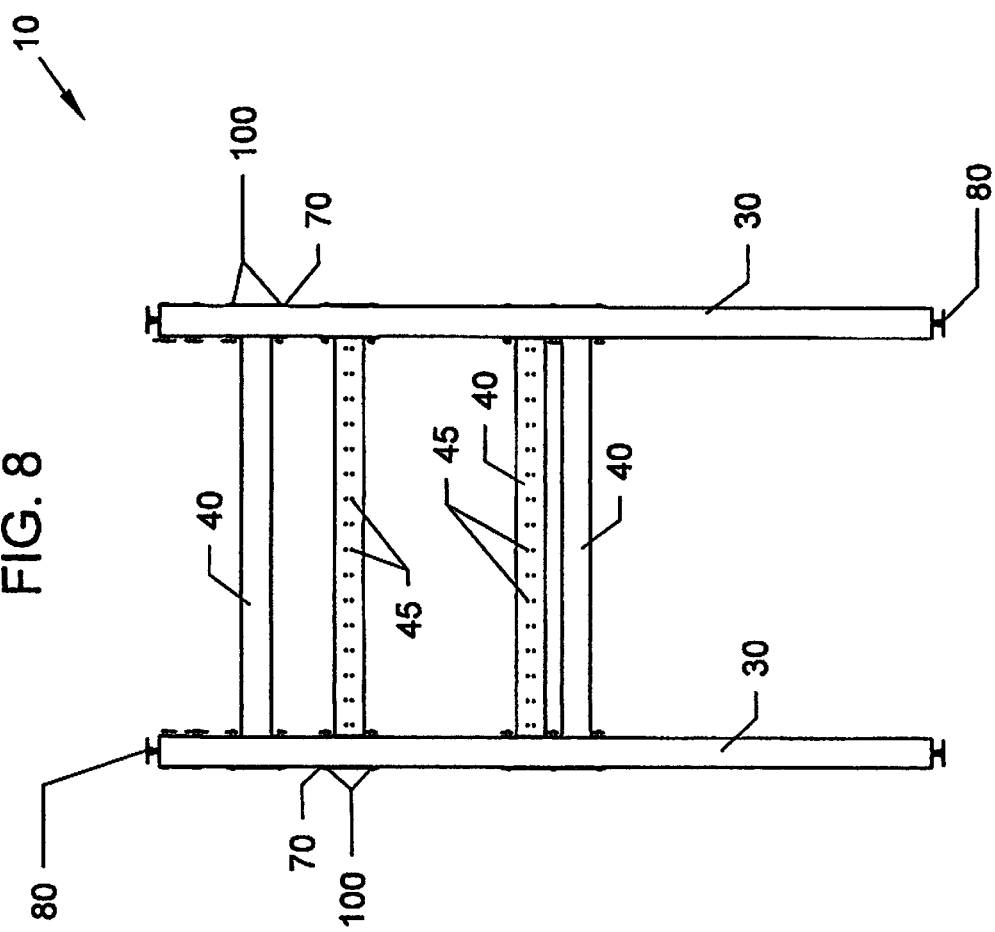

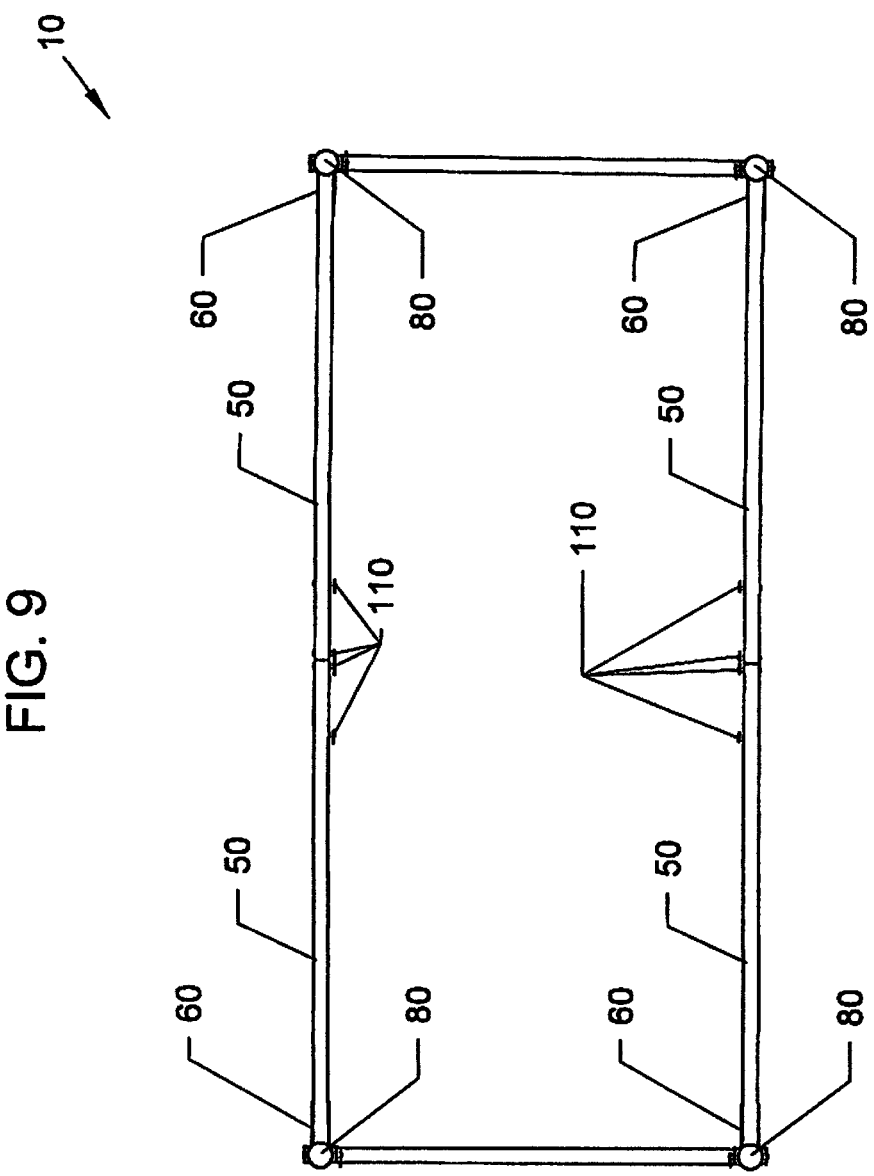

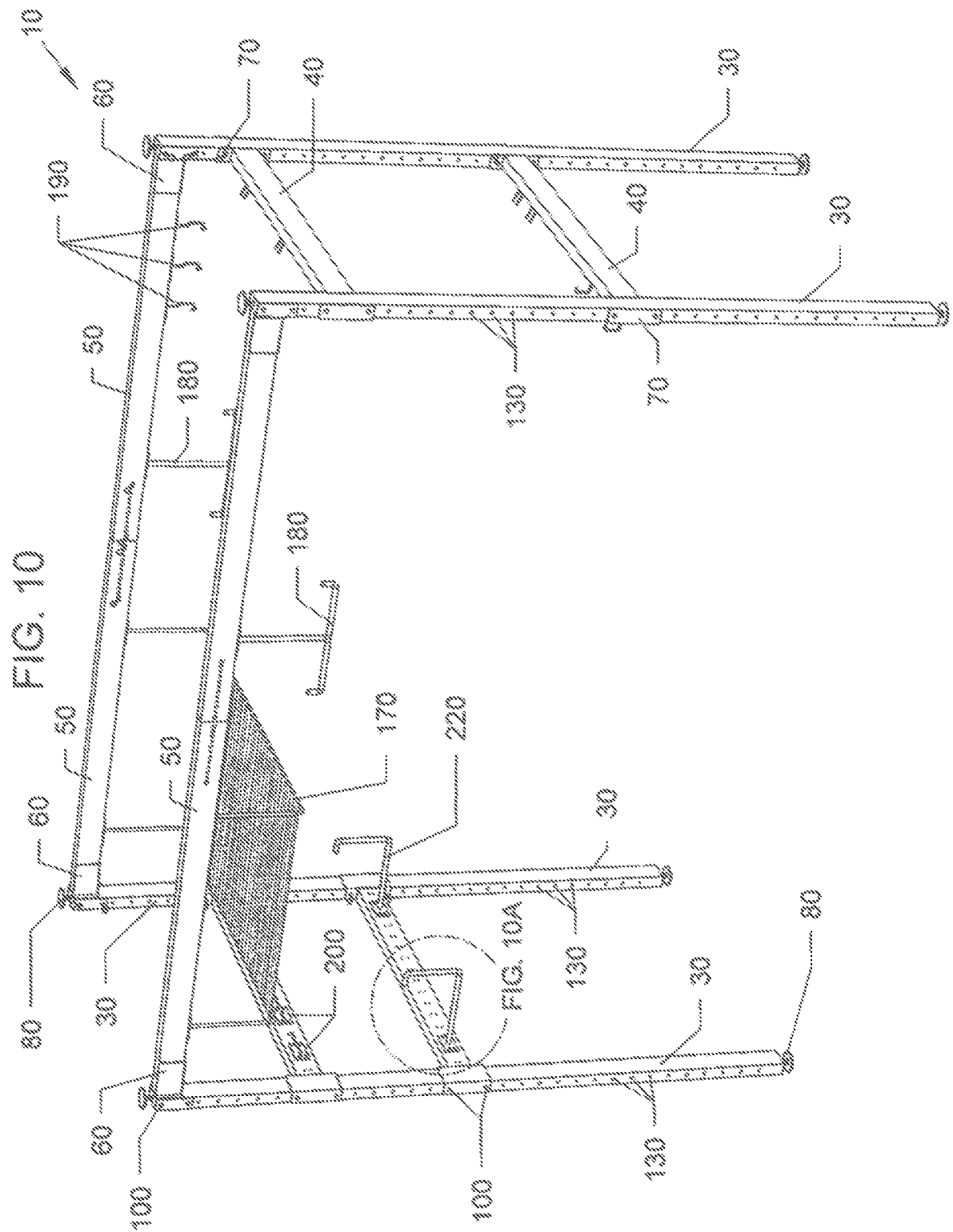

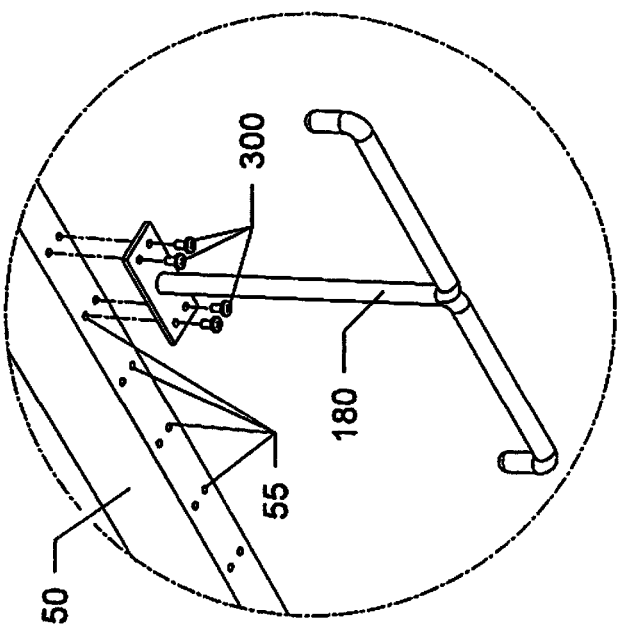
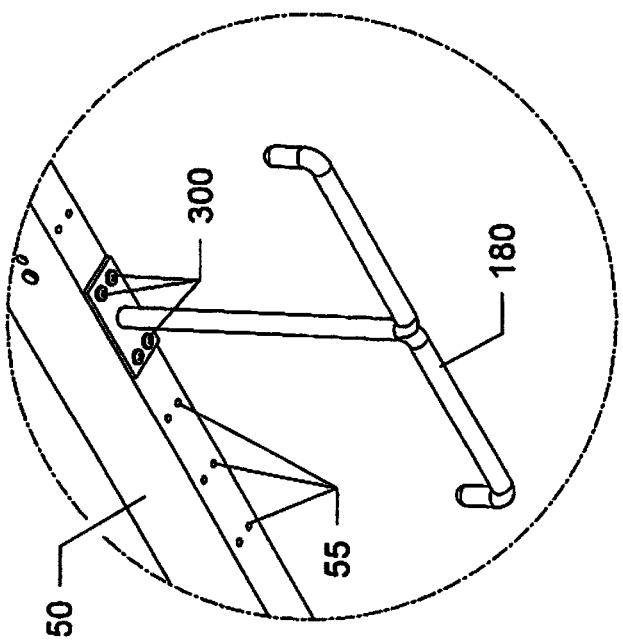

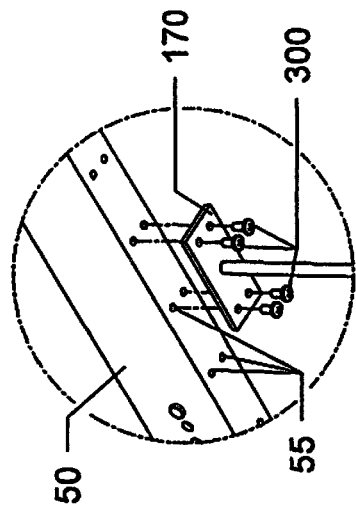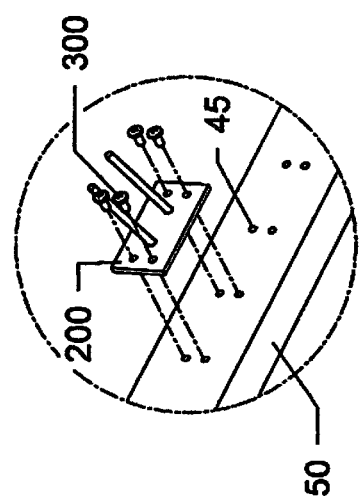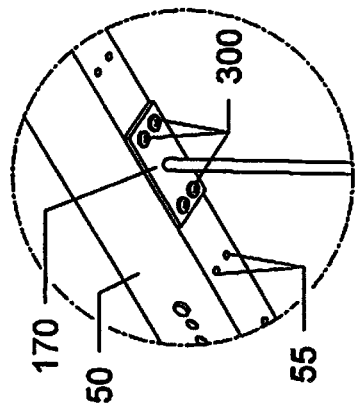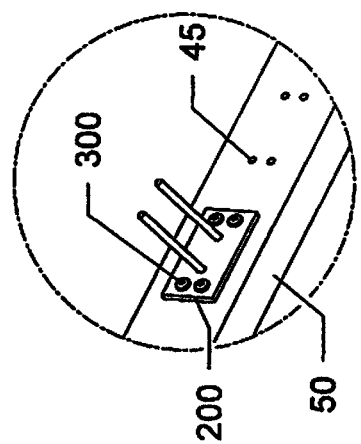

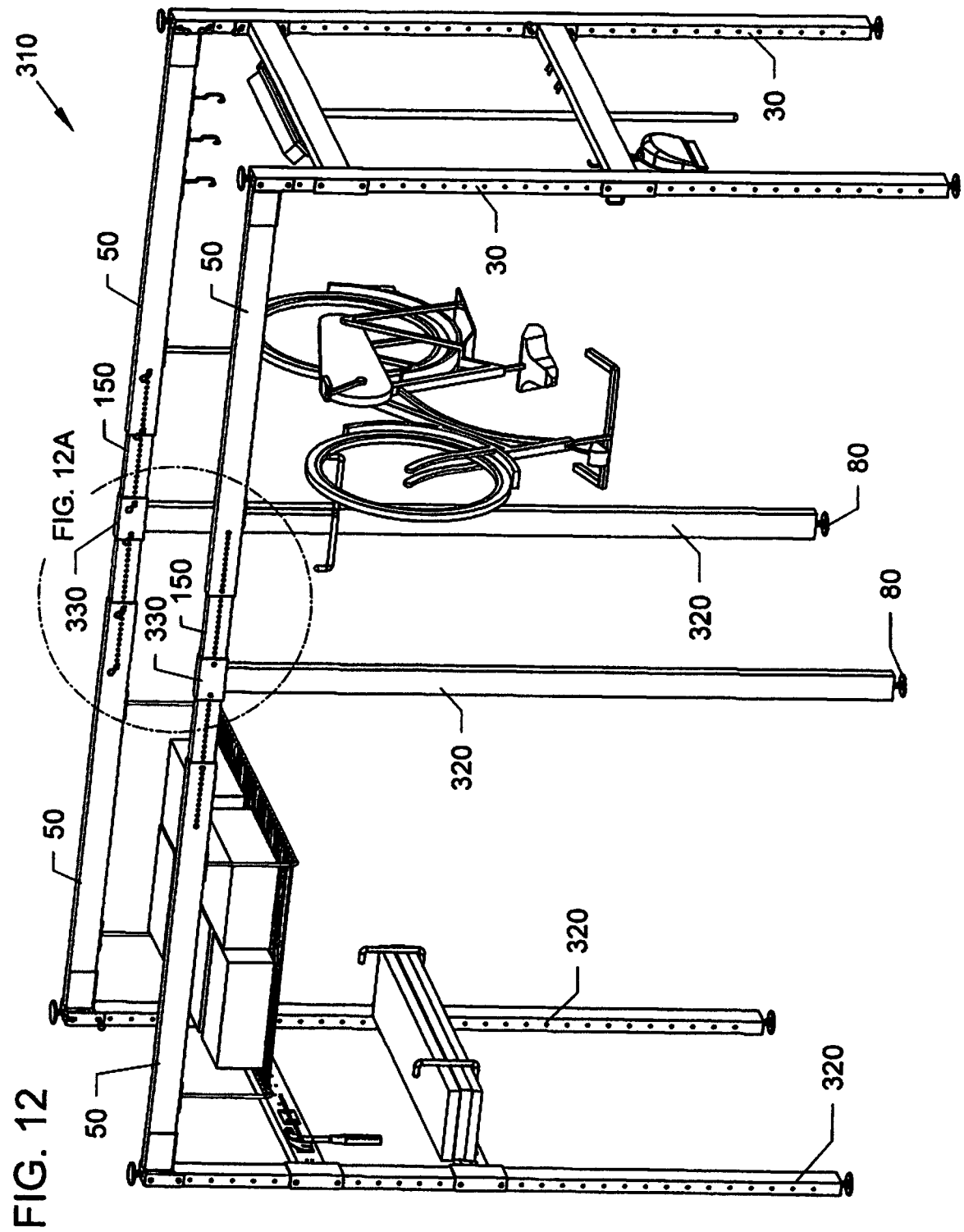

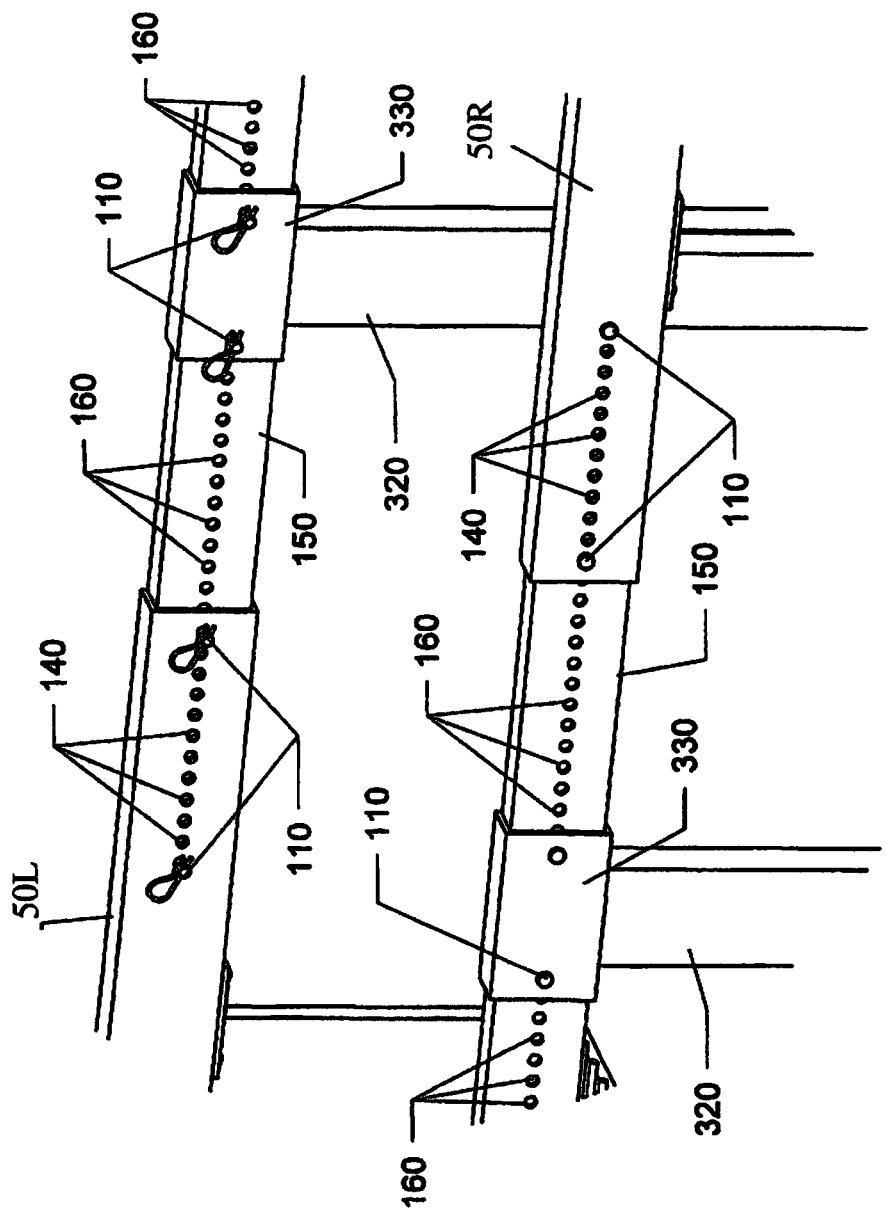

OVERHEAD STORAGE SYSTEM AND METHOD

RELATED APPLICATIONS

This application is a Continuation-In-Part of U.S. patent application Ser. No. 16/138,025 filed Sep. 21, 2018, now U.S. Pat. No. 10,646,035, which is incorporated by reference in its' entirety.

FIELD OF INVENTION

This invention relates to storage, and in particular to providing stable and free-standing overhead storage rack systems and methods with shelves for storing large items for use in spaces, such as garages, storage facilities, basements, and other rooms, that are secured to ceilings and floors, without permanently mounting the shelves in place, and without requiring tools.

BACKGROUND AND PRIOR ART

Storage systems for garage spaces have often required that materials such as shelves and the like. In order to store large bulk items, such as but limited to paint cans, tools, bicycles, automobile parts, etc. the storage shelves cannot be free standing, and must be permanently mounted to walls, and the like to be secure. Permanent mounting installation has many problems.

To install permanently mounted shelves requires an installer generally use fasteners, such as screws, bolts, nails, and the like, to mount such shelves to studs inside of walls. In addition, floor to ceiling shelves can also include mounting the shelves and their stands to ceilings and floors, which would also require permanent mounting with similar fasteners, such as screws, bolts, nails, and the like.

In addition to the damage to surfaces that can be caused by permanent mounting with fasteners, there is also a substantial cost for materials, such as but not limited to wood, and metal and the like. Furthermore, there can a substantial cost for the time and labor required for installing permanent shelves. And furthermore, permanent installation requires the use of power tools, such as but not limited to drills, power saws, and the like, as well as basic tools, such as but not limited to pliers, screw drivers, hammers, and the like.

In addition, commercial storage facilities, college dorm rooms and many rental communities do not allow for permanent attachment resulting in damage to the ceiling or walls.

Thus, the need exists for solutions to the above problems with the prior art requirements for providing stable shelves for storage that does not require permanently mounting the shelves.

SUMMARY OF THE INVENTION

A primary objective of the present invention is to provide stable and free-standing overhead storage rack systems and methods with shelves for storing large items for use in spaces, such as garages, storage facilities, basements, and other rooms, that are secured to ceilings and floors, without permanently mounting the shelves in place.

A secondary objective of the present invention is to provide stable and free-standing overhead storage rack systems and methods with shelves for storing large items for use in spaces, such as garages, storage facilities, basements, dorm rooms and other rooms, that are secured to ceilings and floors, without damage or requiring tools to install.

The novel overhead garage storage system can be used where permanent attachment is not allowed and/or the customer is not DIY (do it yourself) capable. This novel system is a free standing, no tools required, erector set type storage product for all types of rooms and a similar desktop storage configuration to house printers, scanners, folder etc.

Each of the four vertical side supports of the overhead storage system can utilize only approximately few inches of floor space. Once erected this completed storage rack can support multiple ceiling type overhead storage racks, "2-way adjustable overhead hooks" and many other storage solutions. The integrated horizontal supports not only stabilize the unit, but can also act as additional storage for items like rakes, shovels, bicycles, electrical cords, brooms etc. This is the only free standing, garage storage system of it is kind in the world.

A stable free-standing storage system which does not require permanent mounting of the system and is assembled without tools, can include a first vertical post having top and bottom ends, a second vertical post having top and bottom ends, a third vertical post having top and bottom ends, a fourth vertical post having top and bottom ends, wherein the first vertical post and the second vertical post and the third vertical post and the fourth vertical post being arranged in a rectangular configuration on a floor surface, a first horizontal telescoping beam having one end attached adjacent to the top end of the first vertical post and another end attached adjacent to the top end of the third vertical post, the first horizontal telescoping beam having portions that telescope relative to one another to adjust length, and a second horizontal telescoping beam having one end attached adjacent to the top end of the second vertical post and another end attached adjacent to the top end of the fourth vertical post, the first horizontal telescoping beam being parallel to the second horizontal telescoping beam, the second horizontal telescoping beam having portions that telescope relative to one another to adjust length, wherein the storage system is assembled without permanent attachment to support surfaces and without using tools.

The storage system can include a first left horizontal beam having one end attached to the first vertical post approximately midway between the top end and the bottom end of the first vertical post, and another end attached to the second vertical post approximately midway between the top end and the bottom end of the second vertical post, and a first right horizontal beam having one end attached to the third vertical post approximately midway between the top end and the bottom end of the third vertical post, and another end attached to the fourth vertical post approximately midway between the top end and the bottom end of the fourth vertical post.

The storage system can include a second left horizontal beam having one end attached to the first vertical post between the top end of the first vertical post and the first left horizontal beam, and another end attached to the second vertical post between the top end of the second vertical post and the first left horizontal beam, and a second right horizontal beam having one end attached to the third vertical post between the top end of the first second post and the first right horizontal beam, and another end attached to the fourth vertical post between the top end of the fourth vertical post and the first right horizontal beam.

The first horizontal telescoping beam can include a first elongated section having one end fixably attached adjacent to the top end of the first vertical post and another end, a second elongated section having one end fixably attached adjacent to the top end of the third vertical post and another end, and a middle elongated section having ends that telescope with another end of the first elongated section and another end of the second elongated section.

The second horizontal telescoping beam can include a first elongated section having one end fixably attached adjacent to the top end of the second vertical post and another end, a second elongated section having one end fixably attached adjacent to the top end of the fourth vertical post and another end, and an elongated middle section having ends that telescope with another end of the first elongated section and another end of the second elongated section.

The first elongated section and the second elongated section and the middle elongated section of the first horizontal beam can each include a plurality of horizontal opening spaced apart from one another, and pins for allowing the first elongated section and the second elongated section and the middle elongated section of the first horizontal beam to be locked into a selected length position relative to one another.

The first elongated section and the second elongated section and the middle elongated section of the second horizontal beam can each include a plurality of horizontal opening spaced apart from one another, and pins for allowing the first elongated section and the second elongated section and the middle elongated section of the second horizontal beam to be locked into a selected length position relative to one another.

The storage system can include a first top threaded footer for extending into and out of the top end of the first vertical post, a first bottom threaded footer for extending into and out of the bottom end of the first vertical post, the first top and bottom threaded footers for stable positioning the first vertical post between the floor and a ceiling, a second top threaded footer for extending into and out of the top end of the first vertical post, a second bottom threaded footer for extending into and out of the bottom end of the second vertical post, the first top and bottom threaded footers for stable positioning the second vertical post between the floor and the ceiling, a third top threaded footer for extending into and out of the top end of the third vertical post, a third bottom threaded footer for extending into and out of the bottom end of the third vertical post, the first top and bottom threaded footers for stable positioning the third vertical post between the floor and the ceiling, a fourth top threaded footer for extending into and out of the top end of the fourth vertical post, and a fourth bottom threaded footer for extending into and out of the bottom end of the fourth vertical post, the first top and bottom threaded footers for stable positioning the fourth vertical post between the floor and the ceiling.

The storage system can further include a fifth vertical post having top and bottom ends, the top end being attached to the first horizontal telescoping beam between the first vertical post and the third vertical post, and a sixth vertical post having top and bottom ends, the top end being attached to the second horizontal telescoping beam between the second vertical post and the fourth vertical post.

The system can consist of positioning four vertical supports (posts), each having upper and lower ends with extendable threaded footers/screw type jacks that can abut each support (post) against both a floor surface and ceiling surface. Arranging the supports (posts) in a generally rectangular configuration with two short spaces between two supports (posts) on a left side and right side, and two long spaces between the two supports (posts) between the left and right pairs of supports (posts).

A pair of horizontal accessory bars, each having retractable pins. One accessory bar can be positioned between the left side pair of vertical supports (posts) and another of the accessory bars can be positioned between the right side pair of vertical supports (posts). Fasteners, such as pins on the accessory bars can protrude into mateable openings adjacent sides of the respective vertical supports (posts). A pair of horizontal beams can be positioned between the left side and the right side vertical supports (posts).

The horizontal accessory bars and horizontal beams can support storage racks, and/or hooks and be used for additional storage for items that include rakes, shovels, bicycles, electrical cords, brooms, and the like.

The novel rack/system can be assembled and installed without using any tools, and without permanently mounting the rack/system to ceilings, walls and/or floors. A user can easily assemble the novel rack/system in a short time without having knowledge of mechanics, and/or carpentry, and/or use of any tools, and the like.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 5A is an enlarged perspective view of the top of the front right vertical post attached to the front horizontal telescoping beam and attached to the top right horizontal member shown in FIG. 5.

FIG. 5B is an exploded perspective view of FIG. 5A.

FIG. 5C is an enlarged perspective view of the rear horizontal telescoping beam of FIG. 5.

FIG. 5D is an exploded perspective view of the left and right elongated sections which telescope about the middle elongated section in the telescoping beam of FIG. 5D.

FIG. 5E shows the separate elongated sections attached to one another by the middle elongated section in FIG. 5D.

FIG. 6 is an exploded front perspective view of the storage rack system shown in FIG. 5.

FIG. 7 is a front side view of the assembled storage rack system of FIG. 6.

FIG. 7A is an enlarged view of the bottom of the front left vertical post and threaded footer shown in FIG. 7.

FIG. 7B is an enlarged view of the top of the front right vertical post and threaded footer shown in FIG. 7.

FIG. 8 is a left end view of the assembled storage rack system of FIG. 7.

FIG. 9 is a top view of the assembled storage rack system of FIG. 7.

FIG. 10 is another perspective view of the storage rack system of FIG. 1 without items being stored.

FIG. 11C is an enlarged view of a double hook hanging accessory attached under a telescoping horizontal beam in the storage rack system of FIG. 11.

FIG. 11D is an exploded view of the double hook hanging accessory separated from the horizontal beam in FIG. 11C.

FIG. 11E is an enlarged view of a hanging shelf accessory attachment under a telescoping horizontal beam in the storage rack system of FIG. 11.

FIG. 11F is an exploded view of the hanging shelf accessory attachment separated from the horizontal beam in FIG. 11E.

FIG. 11G is an enlarged view of a dual post accessory attached to a horizontal member in FIG. 11.

FIG. 11H is an exploded view of the dual post accessory separated from the horizontal member in FIG. 11G.

FIG. 12 is a front perspective view of another storage rack system of FIG. 1 with a middle set of vertical posts.

FIG. 12A is an enlarged view of the top of the middle vertical posts 320 attached to middle sections 150 telescoping horizontal beams 50.

DESCRIPTION OF THE PREFERRED EMBODIMENTS

Figure 1:
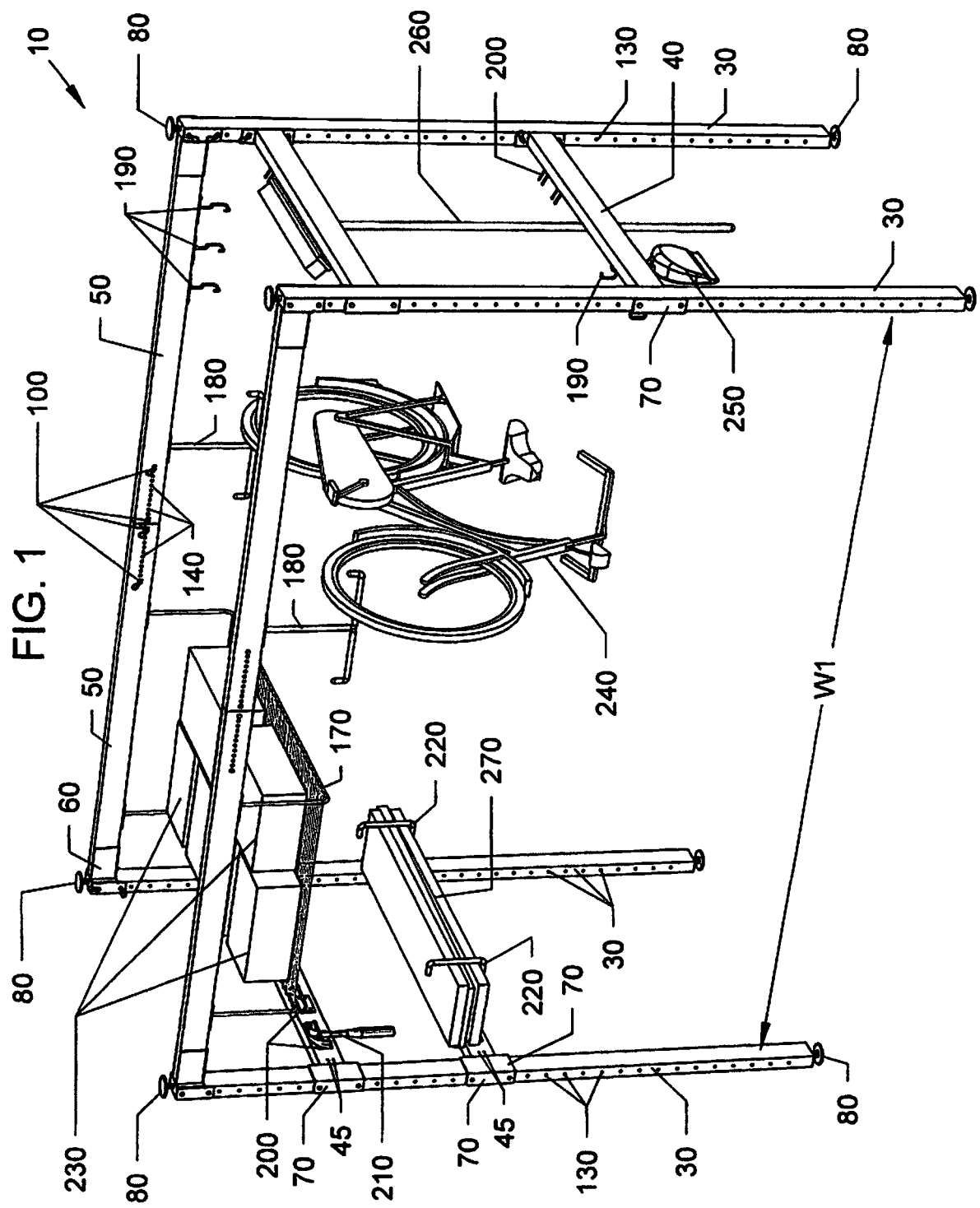
FIG. 1 is a front right perspective view of a storage rack system set up with an example accessory configuration showing specific items stored.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

10 Storage rack system/assembly. Set at minimum width 'W1'.

20 Storage rack system/assembly. Set at maximum width 'W2'.

30 Vertical member/post.

40 Adjustable side horizontal member can be moved up or down as the user wishes and additional side Horizontal members can be added to a configuration. It's location and quantity are not fixed.

45 Threaded holes in side horizontal members for accessory mounting.

50 Top horizontal telescoping beam(s) are split into two pieces (left elongated section and right elongated section per side) with a middle elongated section functioning as a width adjustment insert 150 that slides inside of both the left elongated section and the right elongated section. This insert unifies the left and right elongated section of the horizontal telescoping beams and gives them structural stability.

The middle elongated section/insert also allows for limited adjustment of the width of the storage rack system.

50L Left elongated section

50R Right elongated section

55 Threaded holes in bottom of top horizontal telescoping beams for accessory mounting.

60 Top member mounting bracket is welded to top member and is used to secure the top horizontal beam/member to the vertical posts/members.

65 Holes in top horizontal beam/member mounting bracket for securing to vertical post/member.

70 Side horizontal member mount bracket is welded to the side horizontal member and is used to secure the side horizontal member to the vertical posts/members.

75 Holes in side horizontal/member mount bracket for securing to vertical post/member.

80 Threaded adjustable foot/footer allows the system/frame assembly to securely grip to the ceiling and floor of the space in which the system/assembly is installed.

90 Threaded holes in the top and bottom of the vertical posts/members accept the adjustable foot/footer.

100 fasteners, such as but not limited to Long clevis pin for attachment of the top member to the vertical post/member; and the side horizontal member to the vertical post/member 110 fasteners, such as but not limited to Short clevis pin for attachment of the top members (left elongated section, right elongated section) to the middle elongated section (width adjustment insert).

120 Mount holes on vertical post/member for mounting of the top post/member.

130 Mount holes on the vertical post/member for mounting of the adjustable side horizontal member.

140 Holes in the top members for securing to the middle elongated section (width adjustment insert).

150 Middle elongated section (width adjustment insert).

160 Holes in the middle elongated section (width adjustment insert).

for securing to the top posts/members.

170 Hanging shelf accessory.
180 Double hook hanging accessory.
190 'J' hook hanging accessory.
200 Angle post hanging accessory.
210 Hammer
220 'J' hook support accessory.
230 Boxes
240 Bicycle
250 Dust pan
260 Push broom
270 Boards
280 Ceiling.
290 Floor.
300 Accessory mounting fasteners, such as but not limited to pins, screws, bolts and the like.
310 Storage rack system/frame set to maximum width ('W2') with optional middle support posts/legs.
320 Optional middle support post/leg attaches to the middle elongated section (width adjustment insert) with clevis pins.
330 Top bracket is welded to the top of the middle support post/leg and attaches to the middle elongated section (width adjustment insert) with clevis pins.
400 shelf embodiment
410 shelf FIG. 1 is a front right perspective view of a storage rack system 10 set up with an example accessory configuration showing specific items stored. The storage rack system 10 is set at a minimum width W1.

The horizontal members 40 and telescoping beams 50 and vertical posts/members have threaded holes 130 strategically placed to offer an endless array of ways to attach accessory hooks 180, 190, 220, shelves, 170, and the like for storage possibilities. Items to be stored can include but are not limited to a hammer 210, boxes 230, a bicycle 240, dustpan 250, a push broom 260, boards 270, and other items. The width of the system/assembly 10 can be adjustable and it is shown in this figure at its minimum width: 'W1'.

Figure 2:
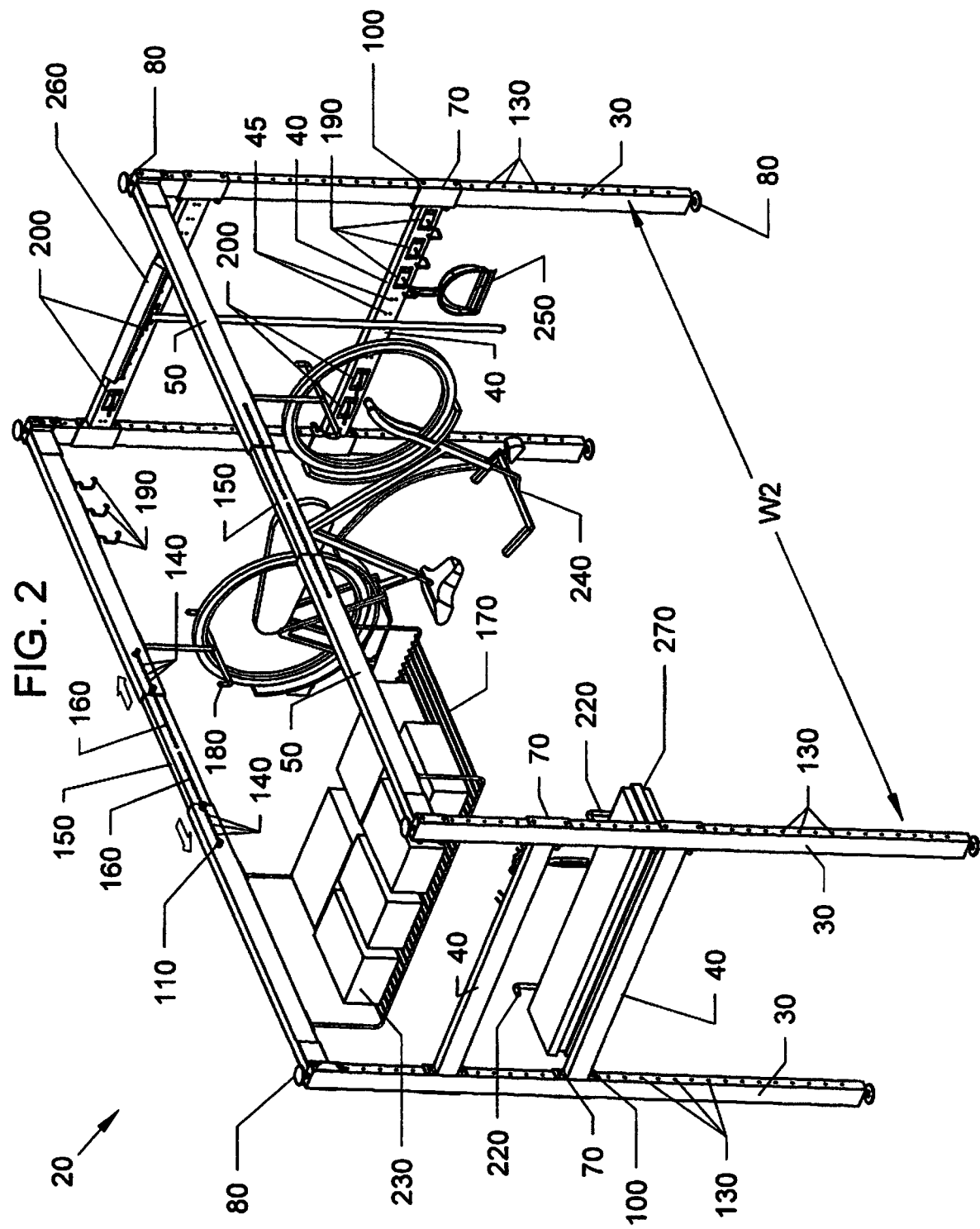
FIG. 2 is a front left perspective view of the storage rack system of FIG. 1. The width of the assembly in this figure

FIG. 2 is a front left perspective view of the storage rack system 20 of FIG. 1. The width of the system/assembly 20 can be moved from the minimum width W1 (shown in FIG. 1) to a maximum width of W2 shown in FIG. 2.

Figure 3:
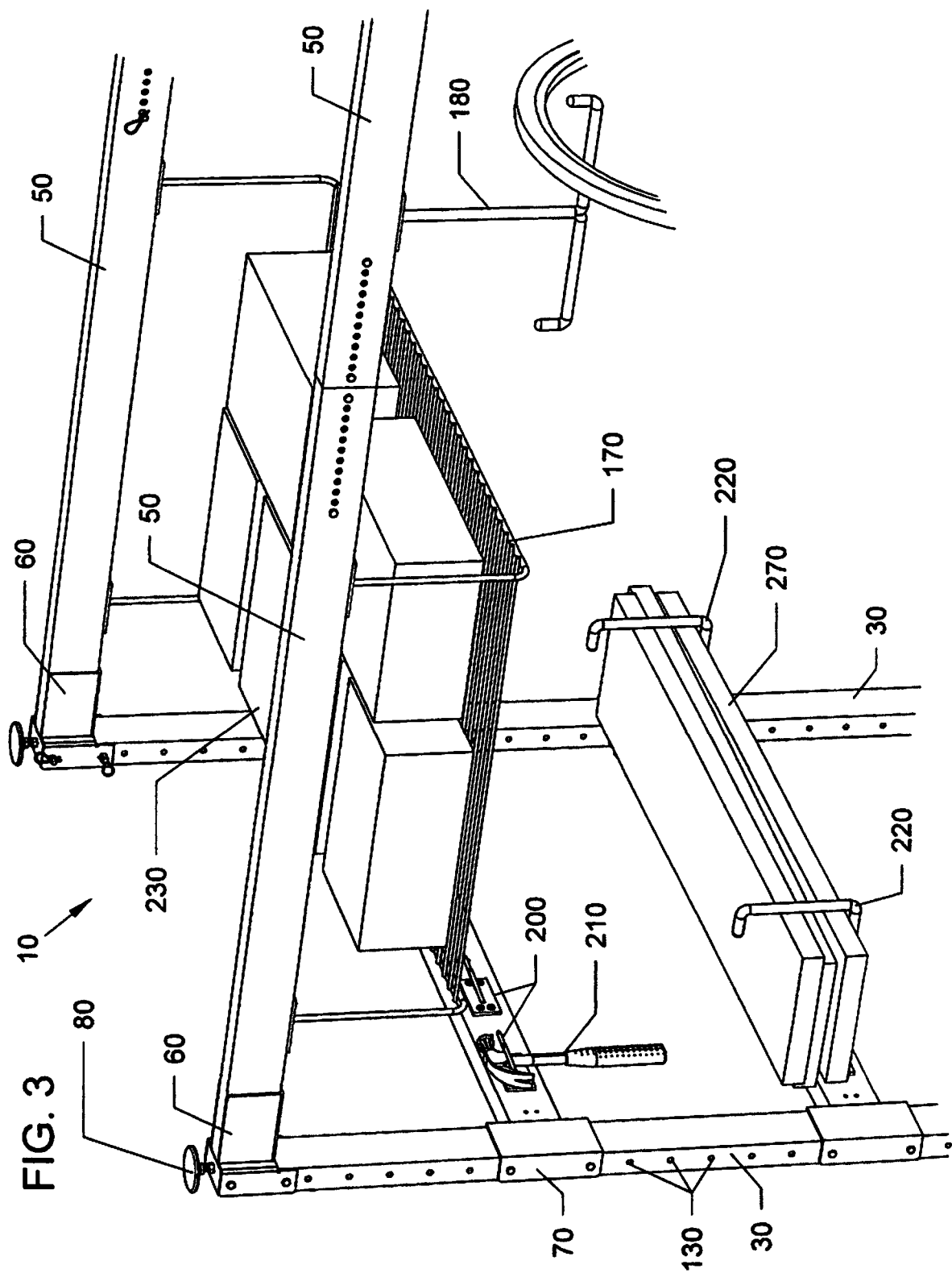
FIG. 3 is an enlarged upper front left perspective view of the storage rack system of FIG. 1.
Figure 4:
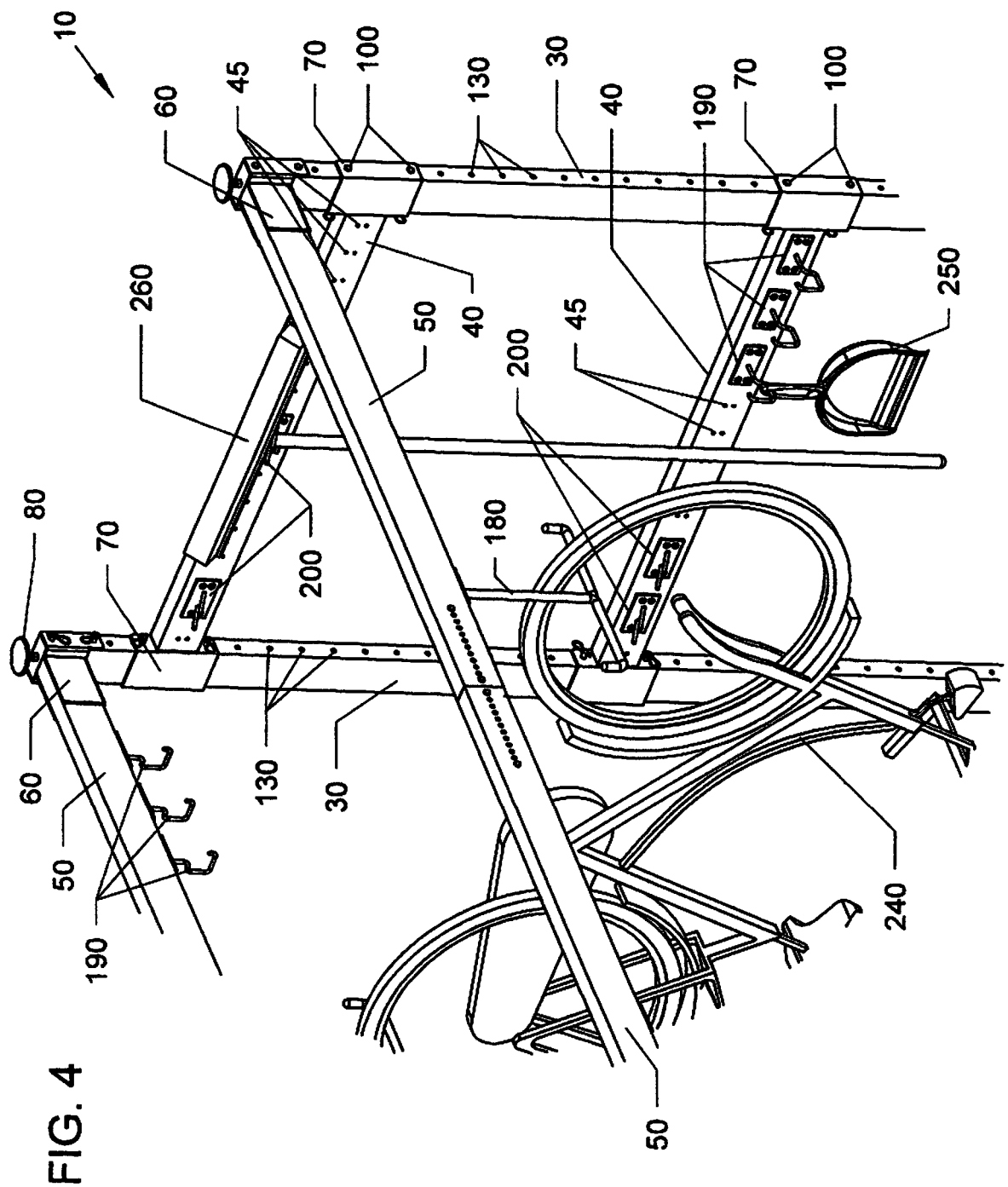
FIG. 4 is an enlarged upper front right perspective view of the storage rack system of FIG. 1.

FIG. 3 is an enlarged upper front left perspective view of the storage rack system 10 of FIG. 1. FIG. 4 is an enlarged upper front right perspective view of the storage rack system 10 of FIG. 1.

Figure 5:
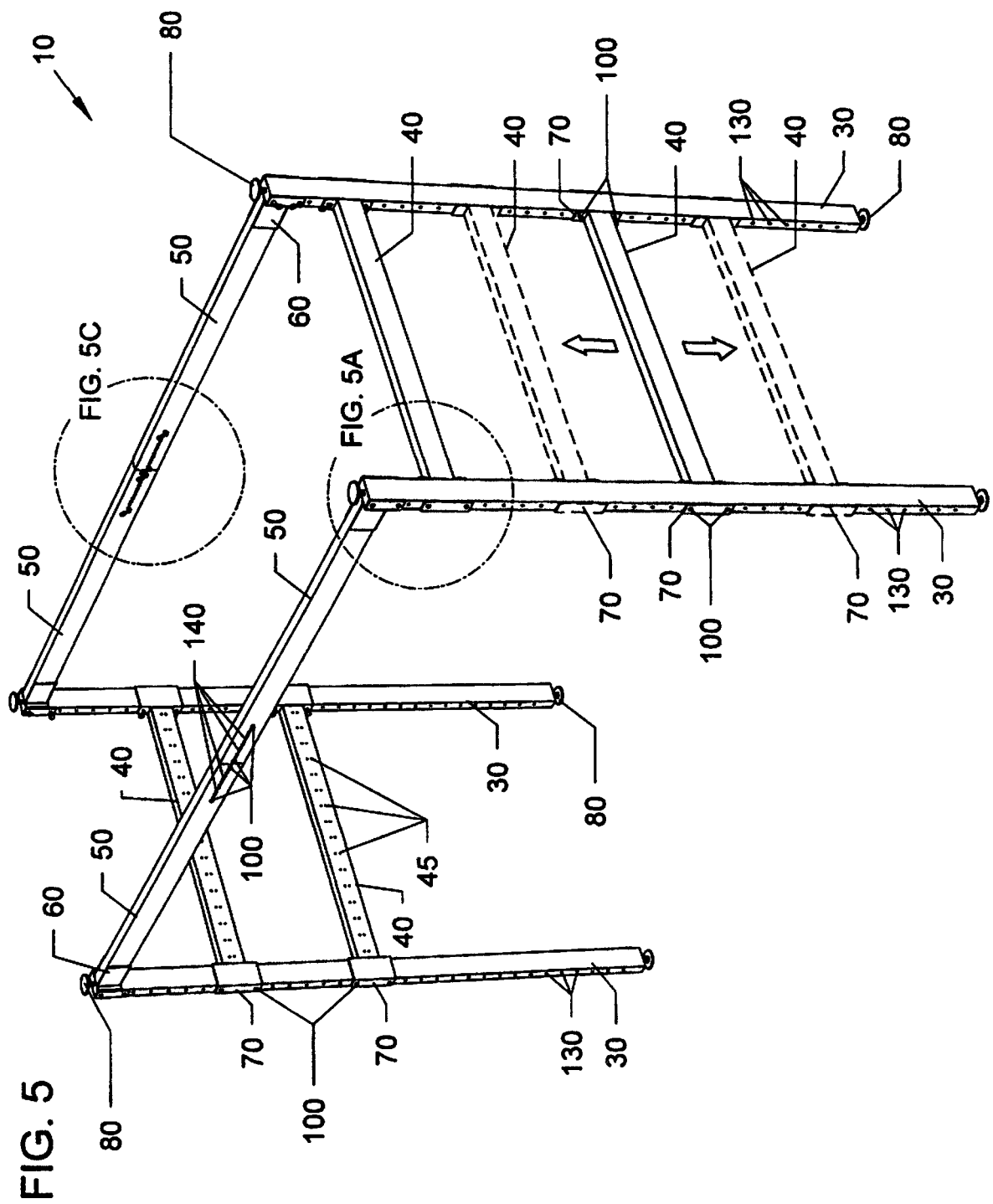
FIG. 5 is another front right perspective view of the storage rack system of the preceding FIGURES stripped of all accessories.

FIG. 5 is another front right perspective view of the storage rack system 10 of the preceding FIGURES stripped of all accessories (such as the hooks 180, 190, 220, and hanging shelf 170.

FIG. 5A is an enlarged perspective view of the top of the front right vertical post 30 attached to the front horizontal telescoping beam 50 and attached to the top right horizontal member 40 shown in FIG. 5. FIG. 5B is an exploded perspective view of FIG. 5A.

Referring to FIGS. 1-5B, the storage rack assembly/system 10 can include four vertical posts 30 arranged in a rectangular configuration, with two parallel telescoping horizontal beams 50 attached to tops of pairs of vertical posts 30. Outer ends of the telescoping horizontal beams 50 can be attached to upper ends of the vertical posts 30 by having inward facing side panels of a top member mounting bracket pre-attached to an end of the horizontal telescoping beam(s) 50, by various techniques such as but not limited to pre-molded thereon, welding, adhesives, and the like.

Outer extending ends of the bracket 60 can have U shape that fits about upper sides of the vertical posts 30, and can be attached to one another by passing fasteners 100, such as but not limited to long clevis pins through side holes 65 in the outer ends of the brackets 60 and through pairs of mounting holes 120 in the upper sides of the vertical posts 30.

Horizontal members 40 can be attached to vertical posts 30 by U shaped outer ends of side horizontal member mount brackets 70 that can have inner ends be pre-attached to an end of the horizontal member(s) 40 by various techniques such as but not limited to pre-molded thereon, welding, adhesives, and the like.

Outer extending ends of the bracket 70 can have U shape that fits about upper sides of the vertical posts 30, and can be attached to one another by passing fasteners 100, such as but not limited to long clevis pins through side holes 75 in the outer ends of the brackets 70 and through pairs of mounting holes 130 in the upper sides of the vertical posts 30.

FIG. 5C is an enlarged perspective view of the rear horizontal telescoping beam 50 of FIG. 5. FIG. 5D is an exploded perspective view of the left and right elongated sections 50L, 50R, which telescope about the middle elongated section (width elongated section) 150 in the telescoping beam 50 of FIG. 5D. FIG. 5E shows the separate elongated sections 50L, 50R attached to one another by the middle elongated section (width adjustment insert) 150 shown in FIG. 5D.

FIG. 6 is an exploded front perspective view of the storage rack system 10 shown in FIG. 5.

Referring to FIGS. 1-6, the telescoping horizontal beams 50 can include a middle elongated section (width adjustment insert) 150 having opposite ends which can fit into open hollow portion of a left elongated section 50L and a right elongated section 50R, and positioned to a desire overall length by fasteners, such as but not limited to short clevis pin(s) 110 that pass through holes 140 in the left elongated section 50L and into holes 160 in the middle elongated section 150.

Similarly, a right end of the middle elongated section 150 can fit into an open hollow portion of the outer end of the right elongated section 50R, and positioned to a desire overall length by fasteners, such as but not limited to short clevis pin(s) 110 that pass through holes 140 in the right elongated section 50R and into holes 160 in the middle elongated section 150.

FIG. 7 is a front side view of the assembled storage rack system 10 of FIG. 6. FIG. 7A is an enlarged view of the bottom of the front left vertical post 30 and threaded footer/foot 80 shown in FIG. 7. FIG. 7B is an enlarged view of the top of the front right vertical post 30 and threaded footer/foot 80 shown in FIG. 7.

Referring to FIGS. 1-7B, footers (feet) 80 having threaded stems can be rotated into threaded socket type openings 90 in the top and bottom ends 30 of the vertical posts and rotated clockwise and counter-clockwise to different lengths of the posts 30 so as to adjust the system/assembly 10 to fit against a surface of a ceiling 280 and surface of a floor 290 so as to stabilize the system/assembly 10 in place without permanently attaching the system/assembly 10 to a ceiling 280, floor 290 or walls.

FIG. 8 is a left end view of the assembled storage rack system 10 of FIG. 7 and shows threaded holes 45 in the side horizontal members 40 for accessories to be mounted thereon.

FIG. 9 is a top view of the assembled storage rack system 10 of FIG. 7.

FIG. 10 is another perspective view of the storage rack system 10 of FIG. 1 without items, such as boxes 230, bicycle 240, dust pan 250, and boards 270 being stored.

Figure 10B:
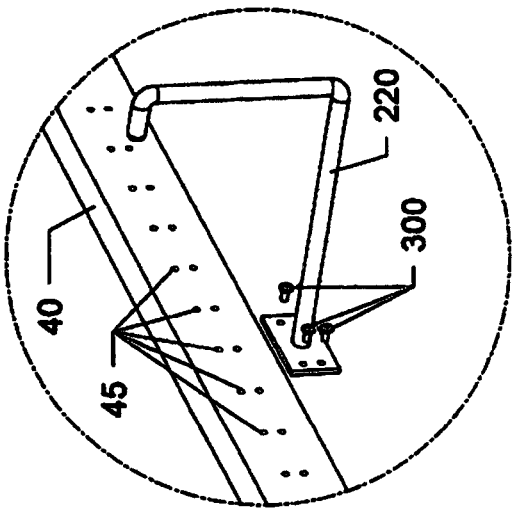
FIG. 10B is an exploded view of the J hook support accessory separated from the left horizontal member in FIG. 10A.
Figure 10A:
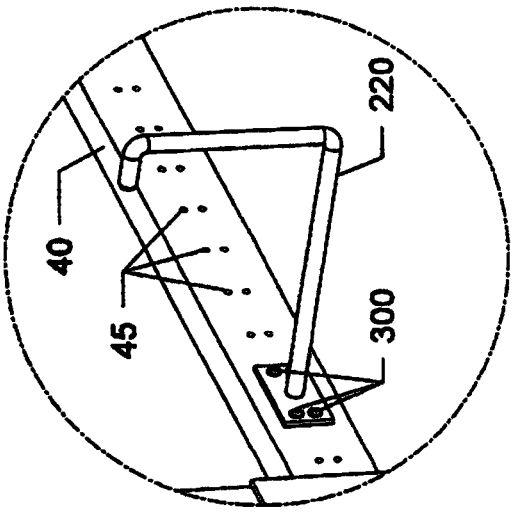
FIG. 10A is an enlarged view of the J hook support accessory attached to the left horizontal member in storage rack system of FIG. 10.

FIG. 10A is an enlarged view of the J hook support accessory 220 attached to the left horizontal member 40 in storage rack system 10 of FIG. 10. FIG. 10B is an exploded view of the J hook support accessory 220 separated from the left horizontal member 40 in FIG. 10A. Fasteners 300, such as but not limited to pins, screws, bolts, and the like, can attach base plate portions of a J hook support accessory into holes 45 in a horizontal member 40.

Figure 11B:
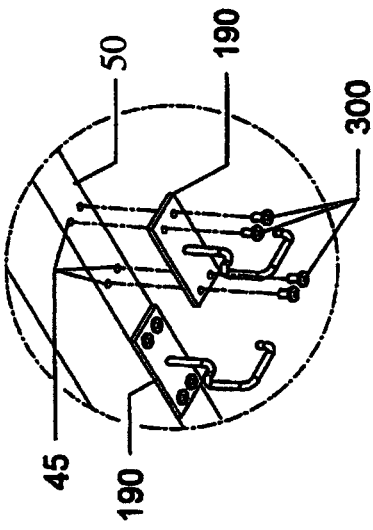
FIG. 11B is an exploded view of one of the hanging J hook accessories in FIG. 11A separated from the telescoping horizontal beam.
Figure 11A:
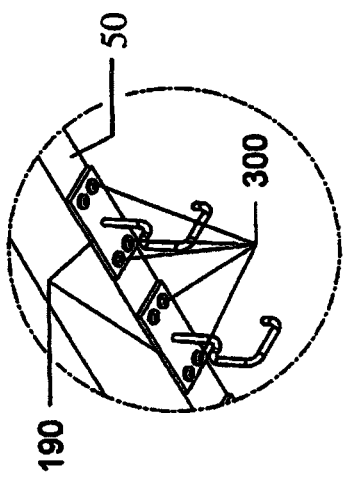
FIG. 11A is an enlarged view of two hanging J hook accessories attached under a telescoping horizontal beam in the storage rack system of FIG. 11.
Figure 11:
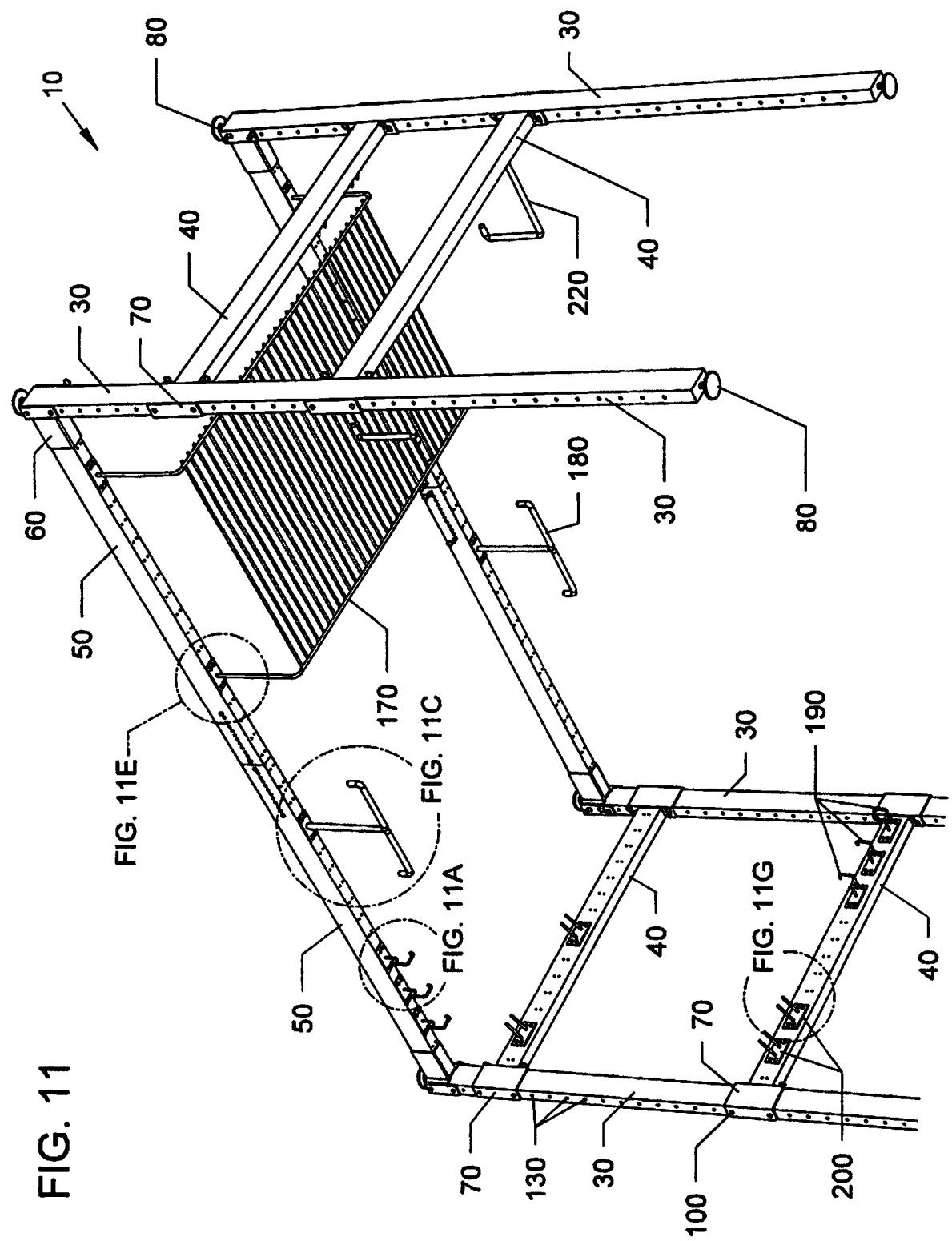
FIG. 11 is a bottom rear left perspective view of the storage rack system of FIG. 10.

FIG. 11 is a bottom rear left perspective view of the storage rack system 10 of FIG. 10. FIG. 11A is an enlarged view of two hanging J hook accessories 190 attached under a telescoping horizontal beam 50 in the storage rack system 1 of FIG. 11. FIG. 11B is an exploded view of one of the hanging J hook accessories 190 in FIG. 11A separated from the telescoping horizontal beam 50. Fasteners 300, such as but not limited to pins, screws, bolts, and the like, can attach base plate portions of a J hook hanging accessory 190 into holes 45 in a horizontal telescoping beam 50.

FIG. 11C is an enlarged view of a double hook hanging accessory 180 attached under a telescoping horizontal beam 50 in the storage rack system of FIG. 11. FIG. 11D is an exploded view of the double hook hanging accessory 180 separated from the horizontal beam 50 in FIG. 11C. Fasteners 300, such as but not limited to pins, screws, bolts, and the like, can attach base plate portions of a double hook hanging accessory 180 into holes 45 in a horizontal telescoping beam 50.

FIG. 11E is an enlarged view of a hanging shelf accessory attachment 170 under a telescoping horizontal beam 50 in the storage rack system 10 of FIG. 11. FIG. 11F is an exploded view of the hanging shelf accessory attachment 170 separated from the horizontal beam 50 in FIG. 11E. Fasteners 300, such as but not limited to pins, screws, bolts, and the like, can attach base plate portions of a hanging shelf accessory 170 into holes 55 in a horizontal telescoping beam 50.

FIG. 11G is an enlarged view of an angle dual post accessory 200 attached to a horizontal member 40 in FIG. 11. FIG. 11H is an exploded view of the angle dual post accessory 200 separated from the horizontal member 40 in FIG. 11G. Fasteners 300, such as but not limited to pins, screws, bolts, and the like, can attach base plate portions of an angle dual post accessory 200 into holes 45 in a horizontal telescoping beam 50.

Materials:

The posts 30 and beams/members 40, 50 can be made of various materials, such as but not limited to wood, steel, aluminum, plastic, fiberglass, carbon fiber or Kevlar.

Using four vertical support posts can be able to adjust to between approximately 8' to approximately 8.5' or higher.

The system can use 2 or more horizontal cross supports, and can adjust up to approximately 48" or more in width.

Two horizontal telescoping beams can be expandable up to approximately 10' or more in length and each beam can support up to approximately 200+ lbs.

Assembly:

A preferred embodiment of the invention can consist of:
1) 4 vertical supports constructed of materials listed above can be sized and adjust to approximately 8' or more in height.
a) 2 vertical supports will be installed on the left side of a space, such as but not limited to a storage unit, a garage, and the like. And 2 vertical supports will be mounted on the right side of the storage unit approximately 48" apart (distance measured by using horizontal cross support). The 4 vertical supports could be held in position using an adjustable height foot/or leveling mechanism that will apply tension/pressure against the floor & the ceiling thus holding the vertical supports in place.
2) Once the 4 vertical supports and 2 horizontal cross supports are properly assembled, connected and/or tensioned, the adjustable up to approximately 10' or greater in length telescoping beams can now be mounted and secured to the left and right pairs of vertical posts.

The assembly of the 2 adjustable approximately 10' cross members (horizontal members) completes the free standing structure that can now quickly & easily support the approximately 48" X approximately 48" overhead racks, U-racks and other accessories.

FIG. 12 is a front perspective view of another storage rack system 310 of FIG. 1 with a middle set of vertical posts 320. FIG. 12A is an enlarged view of the top of the middle vertical posts 320 attached to middle sections 150 telescoping horizontal beams 50.

The top brackets 330 can be pre-attached to the top of middle posts 320 by pre-molding, welding, adhesive, fasteners, and the like. The brackets 330 can attach to the middle section (width adjustment insert) 150 of the telescoping beams 50 by fasteners, such as not limited to clevis pins, screws, and bolts, and the like.

The extra set of vertical posts 320 can allow for a larger extended telescoping beams 50 and provide more stability.

Figure 13:
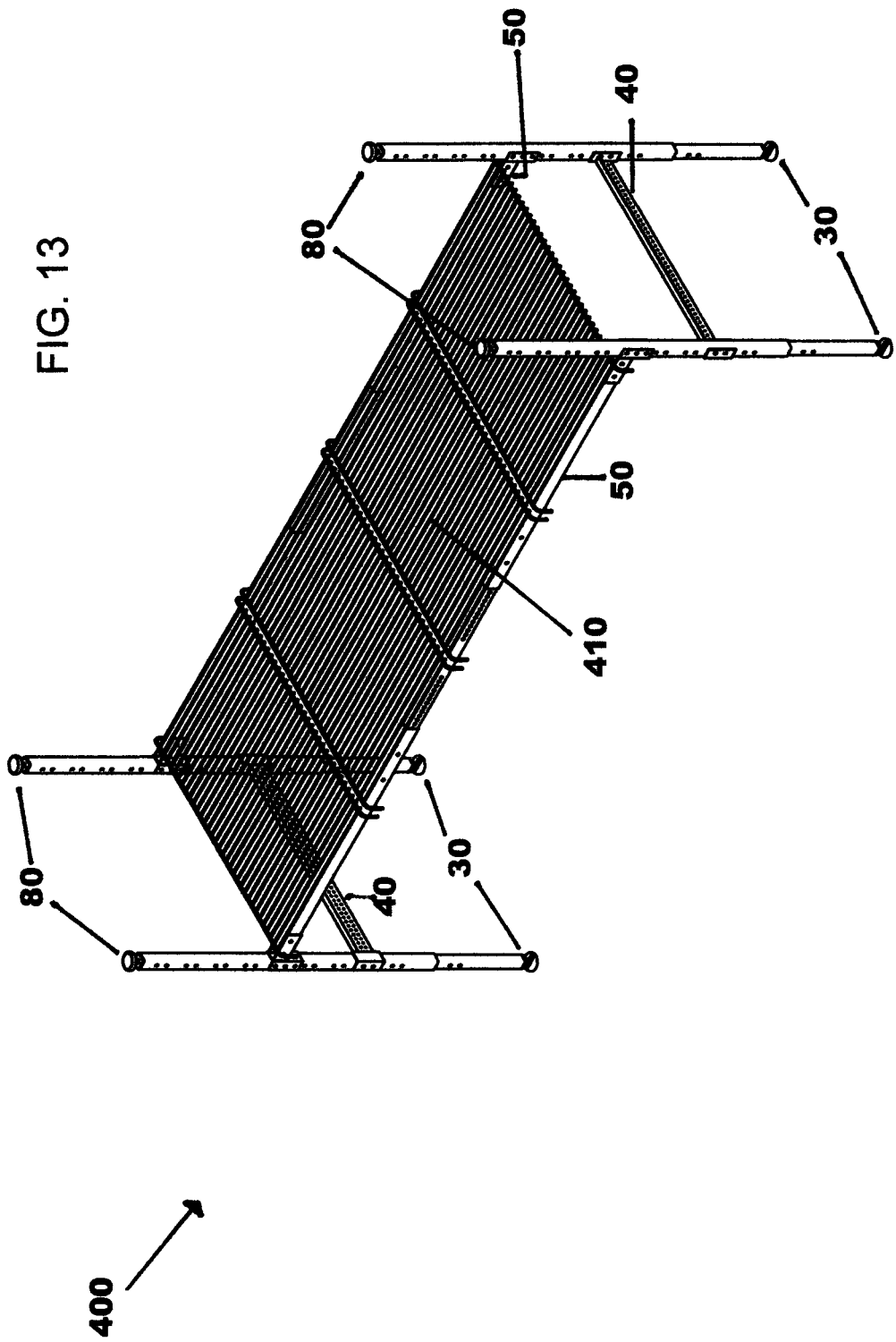
FIG. 13 is a perspective view of another embodiment using the telescoping horizontal beams as a shelf between the top and bottom ends of the vertical posts.

FIG. 13 is a perspective view of another embodiment 400 using the telescoping horizontal beams 50 as a support for a shelf 410 between the top and bottom ends of the vertical posts 30. The telescoping horizontal beams 50 can include the beams previously discussed with ends that wrap about the vertical posts 30 as previously shown and described.

Instead of being located adjacent to the top of the vertical posts 30, the ends of the telescoping horizontal beams 50 can be spaced down from the top of the vertical posts 30 to be used as a support for a shelf 410. The shelf 410 can be a plurality of horizontally positioned boards located across both the upper surfaces of the telescoping horizontal beams 50.

Also, the shelf 410 can be a rack such as a wire rack similar to wire shelf rack accessory 170 previously described which is laid across both the upper surfaces of the telescoping horizontal beams 50. The rest of the system can include threaded footer 80 previously described to allow the system to abut against both a ceiling and a floor surface. Similar to the previous embodiment, no tools are needed to assemble the system.

The shelf 410 can be located high enough so that a front of a vehicle can be parked under the shelf 410

Figure 13A:
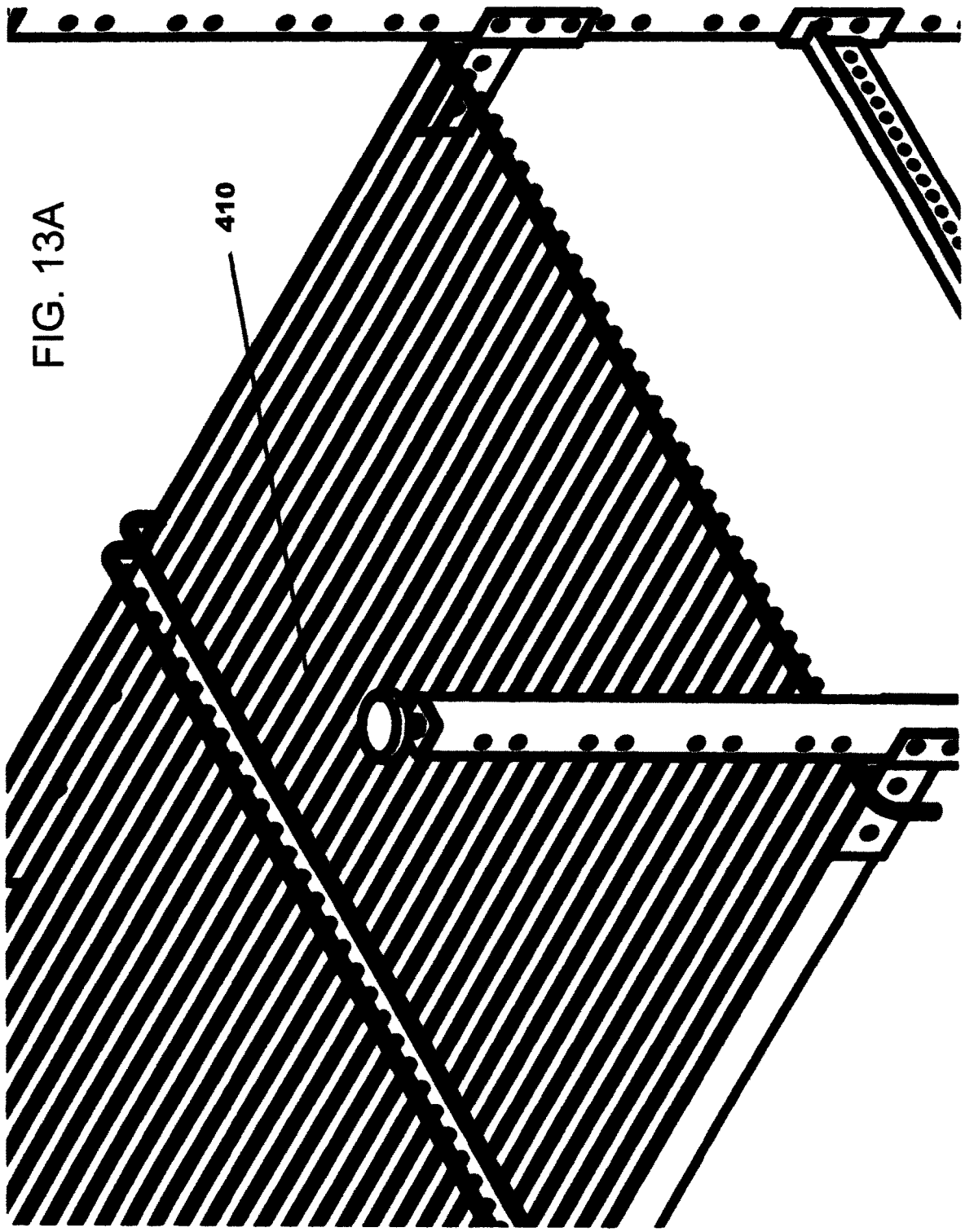
FIG. 13A is an enlarged portion of the shelf in FIG. 13.

FIG. 13A is an enlarged portion of the shelf 410 in FIG. 13.

While some of the fasteners shown in the figures reference pins, the fasteners, can be other types of fasteners, such as but not limited to screws, bolts, and the like. In addition, parts can be attached to one another by positioning extruding buttons into keyhole slots.

The term "approximately" can be +/−10% of the amount referenced. Additionally, preferred amounts and ranges can include the amounts and ranges referenced without the prefix of being approximately.

The parts in the novel storage rack systems, such as the vertical posts, telescoping horizontal beams, left and right side horizontal members, can be formed from various materials, such as but not limited to plastic, fiberglass, aluminum, steel, metal, and combinations thereof.

Although the figures show systems that can be positioned between a ceiling and floor surface, the invention can be practiced with smaller systems. For example, smaller versions of the system can be set up to sit on the top of a desk or table, so that the smaller system has threaded footers that abut against a ceiling on top of vertical posts and against the surface of a desk or table on the bottom of the vertical posts. Smaller systems can be used as book cases and shelves, and the like.

While the figures show the vertical posts 30 and horizontal beams/members 40, 50 having rectangular cross-sectional shapes, the posts 30 and beams/members 40, 50, can have other geometrical shapes, such as but not limited to tubular/cylindrical shapes, triangular cross-sectional shapes, and the like.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A stable free-standing storage system which does not require permanent mounting of the system and is assembled without tools, between a ceiling and a floor, comprising:
   a first vertical post having top and bottom ends;
   a first top threaded footer for extending into and out of the top end of the first vertical post having an upper facing flat face for stable positioning against the ceiling;
   a first bottom threaded footer for extending into and out of the bottom end of the first vertical post having a lower facing flat face for stable positioning against the floor;
   a second vertical post having top and bottom ends;
   a second top threaded footer for extending into and out of the top end of the second vertical post having an upper facing flat face for stable positioning against the ceiling;
   a second bottom threaded footer for extending into and out of the bottom end of the second vertical post having a lower facing flat face for stable positioning against the floor;
   a third vertical post having top and bottom ends;
   a third top threaded footer for extending into and out of the top end of the third vertical post having an upper facing flat face for stable positioning against the ceiling;
   a third bottom threaded footer for extending into and out of the bottom end of the third vertical post having a lower facing flat face for stable positioning against the floor;
   a fourth vertical post having top and bottom ends, wherein the first vertical post and the second vertical post and the third vertical post and the fourth vertical post being arranged in a rectangular configuration on a floor surface;
   a fourth top threaded footer for extending into and out of the top end of the fourth vertical post having an upper facing flat face for stable positioning against the ceiling;
   a fourth bottom threaded footer for extending into and out of the bottom end of the fourth vertical post having a lower facing flat face for stable positioning against the floor;
   a first horizontal telescoping beam having one end having a U-shape attached between the top end and the bottom end of the first vertical post and another end having a U-shape attached between the top end and the bottom end of the third vertical post, the first horizontal telescoping beam having portions that telescope relative to one another to adjust length; and
   a second horizontal telescoping beam having one end with a U-shape fixably attached between the top end and the bottom end of the second vertical post and another end with a U-shape fixably attached between the top end and the bottom end of the fourth vertical post, the first horizontal telescoping beam being parallel to the second horizontal telescoping beam, the second horizontal telescoping beam having portions that telescope relative to one another to adjust length,
   a first left horizontal beam having one end with a U-shape fixably attached to the first vertical post approximately midway between the top end and the bottom end of the first vertical post, and another end with a U-shape fixably attached to the second vertical post approximately midway between the top end and the bottom end of the second vertical post;
   a first right horizontal beam having one end with a U-shape fixably attached to the third vertical post approximately midway between the top end and the bottom end of the third vertical post, and another end with a U-shape fixably attached to the fourth vertical post approximately midway between the top end and the bottom end of the fourth vertical post, wherein the storage system is assembled without permanent attachment to support surfaces and without using tools; and
   a shelf on the first horizontal telescoping beam and on the second horizontal telescoping beam.

2. The storage system of claim 1, wherein
the first horizontal telescoping beam includes a first elongated section, a second elongated section, and a middle elongated section having ends that telescope with an end of the first elongated section and an end of the second elongated section, and
the second horizontal telescoping beam includes a first elongated section, a second elongated section, and an elongated middle section having ends that telescope with the another end of the first elongated section and the another end of the second elongated section.

3. The storage system of claim 2, wherein the first elongated section and the second elongated section and the middle elongated section of the first horizontal beam each include a plurality of horizontal openings spaced apart from one another, and clevis pins for allowing the first elongated section and the second elongated section and the middle elongated section of the first horizontal beam to be locked into a selected length position relative to one another, and wherein
the first elongated section and the second elongated section and the middle elongated section of the second horizontal beam each include a plurality of horizontal openings spaced apart from one another, and clevis pins for allowing the first elongated section and the second elongated section and the middle elongated section of the second horizontal beam to be locked into a selected length position relative to one another.

4. A stable free-standing storage system which does not require permanent mounting of the system and is assembled without tools, between a ceiling and a floor, comprising:
a first vertical post having top and bottom ends;
a first top threaded footer for extending into and out of the top end of the first vertical post having an upper facing flat face for stable positioning against the ceiling;
a first bottom threaded footer for extending into and out of the bottom end of the first vertical post having a lower facing flat face for stable positioning against the floor;
a second vertical post having top and bottom ends;
a second top threaded footer for extending into and out of the top end of the second vertical post having an upper facing flat face for stable positioning against the ceiling;
a second bottom threaded footer for extending into and out of the bottom end of the second vertical post having a lower facing flat face for stable positioning against the floor;
a third vertical post having top and bottom ends;
a third top threaded footer for extending into and out of the top end of the third vertical post having an upper facing flat face for stable positioning against the ceiling;
a third bottom threaded footer for extending into and out of the bottom end of the third vertical post having a lower facing flat face for stable positioning against the floor;
a fourth vertical post having top and bottom ends, wherein the first vertical post and the second vertical post and the third vertical post and the fourth vertical post being arranged in a rectangular configuration on a floor surface;
a fourth top threaded footer for extending into and out of the top end of the fourth vertical post having an upper facing flat face for stable positioning against the ceiling;
a fourth bottom threaded footer for extending into and out of the bottom end of the fourth vertical post having a lower facing flat face for stable positioning against the floor;
a first horizontal telescoping beam having one end having a U-shape attached between the top end and the bottom end of the first vertical post and another end having a U-shape attached between the top end and the bottom end of the third vertical post, the first horizontal telescoping beam having portions that telescope relative to one another to adjust length; and
a second horizontal telescoping beam having one end with a U-shape fixably attached between the top end and the bottom end of the second vertical post and another end with a U-shape fixably attached between the top end and the bottom end of the fourth vertical post, the first horizontal telescoping beam being parallel to the second horizontal telescoping beam, the second horizontal telescoping beam having portions that telescope relative to one another to adjust length,
a first left horizontal beam having one end with a U-shape fixably attached to the first vertical post approximately midway between the top end and the bottom end of the first vertical post, and another end with a U-shape fixably attached to the second vertical post approximately midway between the top end and the bottom end of the second vertical post;
a first right horizontal beam having one end with a U-shape fixably attached to the third vertical post approximately midway between the top end and the bottom end of the third vertical post, and another end with a U-shape fixably attached to the fourth vertical post approximately midway between the top end and the bottom end of the fourth vertical post, wherein the storage system is assembled without permanent attachment to support surfaces and without using tools; and
a shelf on the first horizontal telescoping beam and on the second horizontal telescoping beam, wherein the shelf includes:
a wire rack across a top surface of both of the first horizontal telescoping beam and on the second horizontal telescoping beam.

5. A stable free-standing storage system which does not require permanent mounting of the system and is assembled without tools, between a ceiling and a floor, comprising:
a first vertical post having top and bottom ends;
a first top threaded footer for extending into and out of the top end of the first vertical post having an upper facing flat face for stable positioning against the ceiling;
a first bottom threaded footer for extending into and out of the bottom end of the first vertical post having a lower facing flat face for stable positioning against the floor;
a second vertical post having top and bottom ends;
a second top threaded footer for extending into and out of the top end of the second vertical post having an upper facing flat face for stable positioning against the ceiling;
a second bottom threaded footer for extending into and out of the bottom end of the second vertical post having a lower facing flat face for stable positioning against the floor;
a third vertical post having top and bottom ends;
a third top threaded footer for extending into and out of the top end of the third vertical post having an upper facing flat face for stable positioning against the ceiling;

a third bottom threaded footer for extending into and out of the bottom end of the third vertical post having a lower facing flat face for stable positioning against the floor;

a fourth vertical post having top and bottom ends, wherein the first vertical post and the second vertical post and the third vertical post and the fourth vertical post being arranged in a rectangular configuration on a floor surface;

a fourth top threaded footer for extending into and out of the top end of the fourth vertical post having an upper facing flat face for stable positioning against the ceiling;

a fourth bottom threaded footer for extending into and out of the bottom end of the fourth vertical post having a lower facing flat face for stable positioning against the floor;

a first horizontal telescoping beam having one end having a U-shape attached between the top end and the bottom end of the first vertical post and another end having a U-shape attached between the top end and the bottom end of the third vertical post, the first horizontal telescoping beam having portions that telescope relative to one another to adjust length; and a second horizontal telescoping beam having one end with a U-shape fixably attached between the top end and the bottom end of the second vertical post and another end with a U-shape fixably attached between the top end and the bottom end of the fourth vertical post, the first horizontal telescoping beam being parallel to the second horizontal telescoping beam, the second horizontal telescoping beam having portions that telescope relative to one another to adjust length, a first left horizontal beam having one end with a U-shape fixably attached to the first vertical post approximately midway between the top end and the bottom end of the first vertical post, and another end with a U-shape fixably attached to the second vertical post approximately midway between the top end and the bottom end of the second vertical post;

a first right horizontal beam having one end with a U-shape fixably attached to the third vertical post approximately midway between the top end and the bottom end of the third vertical post, and another end with a U-shape fixably attached to the fourth vertical post approximately midway between the top end and the bottom end of the fourth vertical post, wherein the storage system is assembled without permanent attachment to support surfaces and without using tools; and a shelf on the first horizontal telescoping beam and on the second horizontal telescoping beam, wherein the shelf includes:

a plurality of boards extending across a top surface of both of the first horizontal telescoping beam and on the second horizontal telescoping beam.

6. A stable free-standing storage system which does not require permanent mounting of the system and is assembled without tools, comprising:

a first vertical post having top and bottom ends;

a first top threaded footer for extending into and out of the top end of the first vertical post having an upper facing flat face for stable positioning against the ceiling;

a first bottom threaded footer for extending into and out of the bottom end of the first vertical post having a lower facing flat face for stable positioning against the floor;

a second vertical post having top and bottom ends;

a second top threaded footer for extending into and out of the top end of the second vertical post having an upper facing flat face for stable positioning against the ceiling;

a second bottom threaded footer for extending into and out of the bottom end of the second vertical post having a lower facing flat face for stable positioning against the floor;

a third vertical post having top and bottom ends;

a third top threaded footer for extending into and out of the top end of the third vertical post having an upper facing flat face for stable positioning against the ceiling;

a third bottom threaded footer for extending into and out of the bottom end of the third vertical post having a lower facing flat face for stable positioning against the floor;

a fourth vertical post having top and bottom ends;

a fourth top threaded footer for extending into and out of the top end of the fourth vertical post having an upper facing flat face for stable positioning against the ceiling;

a fourth bottom threaded footer for extending into and out of the bottom end of the fourth vertical post having a lower facing flat face for stable positioning against the floor, wherein the first vertical post and the second vertical post and the third vertical post and the fourth vertical post being arranged in a rectangular configuration on a floor surface;

a first horizontal telescoping beam having one end with a U-shape fixably attached between the top end and the bottom end of the first vertical post and another end with a U-shape fixably attached between the top end and the bottom end of the third vertical post, the first horizontal telescoping beam having portions that telescope relative to one another to adjust length; and a second horizontal telescoping beam having one end with a U-shape fixably attached between the top end and the bottom end of the second vertical post and another end with a U-shape fixably attached between the top end and the bottom end of the fourth vertical post, the first horizontal telescoping beam being parallel to the second horizontal telescoping beam, the second horizontal telescoping beam having portions that telescope relative to one another to adjust length;

a left horizontal beam attached between the first vertical post and the second vertical post; and a right horizontal beam attached between the third vertical post and the fourth vertical post;

a plurality of fasteners for attaching the first horizontal telescoping beam to the first and the third vertical posts, and for attaching the second horizontal telescoping beam to the second and fourth vertical posts, and for attaching the plurality of the left horizontal beams to the first and second vertical posts and for attaching the plurality of right horizontal beams to the third and fourth vertical posts, wherein the storage system is assembled without permanent attachment to support surfaces and without using tools; and a shelf on the first horizontal telescoping beam and on the second horizontal telescoping beam.

7. The storage system of claim 6, wherein the first horizontal telescoping beam includes a first elongated section, a second elongated section, and a middle elongated section having ends that telescope with an end of the first elongated section and the an end of the second elongated section, and the second horizontal telescoping beam includes a first elongated section, a second elongated section, and an elongated middle section having ends that telescope with an end of the first elongated section and an end of the second elongated section.

8. A stable free-standing storage system which does not require permanent mounting of the system and is assembled without tools, comprising:

a first vertical post having top and bottom ends;
a first top threaded footer for extending into and out of the top end of the first vertical post having an upper facing flat face for stable positioning against the ceiling;
a first bottom threaded footer for extending into and out of the bottom end of the first vertical post having a lower facing flat face for stable positioning against the floor;
a second vertical post having top and bottom ends;
a second top threaded footer for extending into and out of the top end of the second vertical post having an upper facing flat face for stable positioning against the ceiling;
a second bottom threaded footer for extending into and out of the bottom end of the second vertical post having a lower facing flat face for stable positioning against the floor;
a third vertical post having top and bottom ends;
a third top threaded footer for extending into and out of the top end of the third vertical post having an upper facing flat face for stable positioning against the ceiling;
a third bottom threaded footer for extending into and out of the bottom end of the third vertical post having a lower facing flat face for stable positioning against the floor;
a fourth vertical post having top and bottom ends;
a fourth top threaded footer for extending into and out of the top end of the fourth vertical post having an upper facing flat face for stable positioning against the ceiling;
a fourth bottom threaded footer for extending into and out of the bottom end of the fourth vertical post having a lower facing flat face for stable positioning against the floor, wherein the first vertical post and the second vertical post and the third vertical post and the fourth vertical post being arranged in a rectangular configuration on a floor surface;
a first horizontal telescoping beam having one end with a U-shape fixably attached between the top end and the bottom end of the first vertical post and another end with a U-shape fixably attached between the top end and the bottom end of the third vertical post, the first horizontal telescoping beam having portions that telescope relative to one another to adjust length; and
a second horizontal telescoping beam having one end with a U-shape fixably attached between the top end and the bottom end of the second vertical post and another end with a U-shape fixably attached between the top end and the bottom end of the fourth vertical post, the first horizontal telescoping beam being parallel to the second horizontal telescoping beam, the second horizontal telescoping beam having portions that telescope relative to one another to adjust length;
a left horizontal beam attached between the first vertical post and the second vertical post; and
a right horizontal beam attached between the third vertical post and the fourth vertical post;

a plurality of fasteners for attaching the first horizontal telescoping beam to the first and the third vertical posts, and for attaching the second horizontal telescoping beam to the second and fourth vertical posts, and for attaching the plurality of the left horizontal beams to the first and second vertical posts and for attaching the plurality of right horizontal beams to the third and fourth vertical posts, wherein the storage system is assembled without permanent attachment to support surfaces and without using tools; and
a shelf on the first horizontal telescoping beam and on the second horizontal telescoping beam, wherein the shelf includes:
a wire rack across a top surface of both of the first horizontal telescoping beam and on the second horizontal telescoping beam.

9. A stable free-standing storage system which does not require permanent mounting of the system and is assembled without tools, comprising:

a first vertical post having top and bottom ends;
a first top threaded footer for extending into and out of the top end of the first vertical post having an upper facing flat face for stable positioning against the ceiling;
a first bottom threaded footer for extending into and out of the bottom end of the first vertical post having a lower facing flat face for stable positioning against the floor;
a second vertical post having top and bottom ends;
a second top threaded footer for extending into and out of the top end of the second vertical post having an upper facing flat face for stable positioning against the ceiling;
a second bottom threaded footer for extending into and out of the bottom end of the second vertical post having a lower facing flat face for stable positioning against the floor;
a third vertical post having top and bottom ends;
a third top threaded footer for extending into and out of the top end of the third vertical post having an upper facing flat face for stable positioning against the ceiling;
a third bottom threaded footer for extending into and out of the bottom end of the third vertical post having a lower facing flat face for stable positioning against the floor;
a fourth vertical post having top and bottom ends;
a fourth top threaded footer for extending into and out of the top end of the fourth vertical post having an upper facing flat face for stable positioning against the ceiling;
a fourth bottom threaded footer for extending into and out of the bottom end of the fourth vertical post having a lower facing flat face for stable positioning against the floor, wherein the first vertical post and the second vertical post and the third vertical post and the fourth vertical post being arranged in a rectangular configuration on a floor surface;
a first horizontal telescoping beam having one end with a U-shape fixably attached between the top end and the bottom end of the first vertical post and another end with a U-shape fixably attached between the top end and the bottom end of the third vertical post, the first horizontal telescoping beam having portions that telescope relative to one another to adjust length; and
a second horizontal telescoping beam having one end with a U-shape fixably attached between the top end and the bottom end of the second vertical post and another end with a U-shape fixably attached between the top end and the bottom end of the fourth vertical post, the first horizontal telescoping beam being parallel to the second horizontal telescoping beam, the second horizontal telescoping beam having portions that telescope relative to one another to adjust length;

a left horizontal beam attached between the first vertical post and the second vertical post; and a right horizontal beam attached between the third vertical post and the fourth vertical post;

a plurality of fasteners for attaching the first horizontal telescoping beam to the first and the third vertical posts, and for attaching the second horizontal telescoping beam to the second and fourth vertical posts, and for attaching the plurality of the left horizontal beams to the first and second vertical posts and for attaching the plurality of right horizontal beams to the third and fourth vertical posts, wherein the storage system is assembled without permanent attachment to support surfaces and without using tools; and a shelf on the first horizontal telescoping beam and on the second horizontal telescoping beam, wherein the shelf includes:

a plurality of boards extending across a top surface of both of the first horizontal telescoping beam and on the second horizontal telescoping beam.

* * * * *